United States Patent
Umemori et al.

(10) Patent No.: US 8,400,084 B2
(45) Date of Patent: Mar. 19, 2013

(54) REGENERATIVE SWITCHED RELUCTANCE MOTOR DRIVING SYSTEM

(75) Inventors: Takashi Umemori, Kamakura (JP); Makoto Tanaka, Yokohama (JP)

(73) Assignee: EV Motor-Systems Co., Ltd., Yokohama-shi (JP)

(*) Notice: Subject to any disclaimer, the term of this patent is extended or adjusted under 35 U.S.C. 154(b) by 203 days.

(21) Appl. No.: 12/995,544

(22) PCT Filed: Jun. 10, 2008

(86) PCT No.: PCT/JP2008/060588
§ 371 (c)(1),
(2), (4) Date: Feb. 25, 2011

(87) PCT Pub. No.: WO2009/150714
PCT Pub. Date: Dec. 17, 2009

(65) Prior Publication Data
US 2011/0148333 A1  Jun. 23, 2011

(51) Int. Cl.
*H02P 3/14* (2006.01)
(52) U.S. Cl. ... 318/376; 318/254; 318/439; 318/400.11; 318/400.22; 318/400.34
(58) Field of Classification Search ............ 318/376, 318/439, 254, 629, 400.1, 400.09, 400.11, 318/400.22, 400.34
See application file for complete search history.

(56) References Cited

U.S. PATENT DOCUMENTS

| | | | |
|---|---|---|---|
| 4,733,333 A * | 3/1988 | Shibata et al. | 362/40 |
| 4,763,347 A * | 8/1988 | Erdman | 318/400.22 |
| 4,772,840 A * | 9/1988 | Taghezout | 318/696 |
| 4,959,797 A * | 9/1990 | McIntosh | 700/275 |
| 5,122,719 A * | 6/1992 | Bessenyei et al. | 318/629 |
| 5,192,902 A * | 3/1993 | Mizumoto et al. | 318/561 |
| 5,198,732 A * | 3/1993 | Morimoto | 318/116 |
| 5,227,704 A * | 7/1993 | Erdman | 318/400.34 |
| 5,257,174 A * | 10/1993 | Ogiwara et al. | 363/36 |
| 5,299,277 A * | 3/1994 | Fujii | 388/815 |
| 5,376,866 A * | 12/1994 | Erdman | 318/400.1 |
| 5,559,375 A * | 9/1996 | Jo et al. | 307/10.1 |
| 5,563,486 A * | 10/1996 | Yamamoto et al. | 318/696 |
| 5,565,762 A * | 10/1996 | Ishikawa et al. | 323/222 |
| 5,708,337 A * | 1/1998 | Breit et al. | 318/400.09 |
| 6,700,346 B2 * | 3/2004 | Jean | 318/685 |

(Continued)

*Primary Examiner* — Paul Ip
(74) *Attorney, Agent, or Firm* — Kratz, Quintos & Hanson, LLP

(57) ABSTRACT

Provided is a regenerative switched reluctance motor driving system which allows a motor to have a reduced size and weight and an increased efficiency as well as improved energy recovery efficiency at the time of regenerative braking without using a neodymium magnet. Based on an angular position of a rotor in the motor, a constant current flip-flop circuit 2 renders two current paths alternately conductive so as to allow a rectangular-wave current having a width of an electrical angle of 180° to alternately flow in two coils in the motor 3, and shifts the timing of rendering the two current paths alternately conductive, between when driving and when braking the motor 3, by a time during which the rotor is rotated by an angle corresponding to an electrical angle of 180°. When driving the motor, a DC constant current power supply unit 1 discharges a DC power supply, while when braking the motor, it receives an input current through a negative terminal of the DC power supply, and outputs a DC current to the constant current flip-flop circuit 2, and further outputs a DC current regenerated from the motor 3 through the constant current flip-flop circuit 2 to a positive terminal of, and thereby charges, the DC power supply.

2 Claims, 16 Drawing Sheets

U.S. PATENT DOCUMENTS

| | | | |
|---|---|---|---|
| 6,891,343 B2 * | 5/2005 | Petersen | 318/400.11 |
| 7,026,773 B2 * | 4/2006 | Petersen | 318/400.01 |
| 7,064,513 B2 * | 6/2006 | Fenley | 318/700 |
| 2004/0178757 A1 * | 9/2004 | Petersen | 318/439 |
| 2005/0073279 A1 * | 4/2005 | Fenley | 318/717 |
| 2005/0184690 A1 * | 8/2005 | Petersen | 318/254 |

* cited by examiner

REGENERATIVE SWITCHED RELUCTANCE MOTOR DRIVING SYSTEM

TECHNICAL FIELD

The present invention relates to a regenerative switched reluctance motor driving system using a regenerative switched reluctance motor for driving an electric car or the like.

BACKGROUND ART

Currently, in representative motor driving systems using a DC power supply, that have been commercialized or proposed, there are (1) those comprising a PWM inverter and a three-phase synchronous motor, (2) those comprising a constant current power supply, a multi-phase constant current inverter and a multi-phase constant current motor, (3) those comprising a PWM inverter and a three-phase induction motor, and (4) those comprising a switched reluctance motor (e.g. Patent Document 1).

The motor driving system (1) has existed for many years, and has advanced rapidly in the last few years by using a strong neodymium magnet in the motor. The motor driving system (2) was invented by the same inventor as the present invention, and makes it possible to reduce the size and weight and increase the efficiency of the motor as compared with the motor driving system (1) when using a neodymium magnet instead of an electromagnet. Furthermore, the motor driving system (2) enables regenerative braking until stop, making it possible to improve energy recovery efficiency.

The motor driving system (3) has existed for many years, and its commercialization was promoted in Japan in advance of the world. The motor driving system (3) does not require detection of the angular position of a rotor in the motor, so that its structural simplification and good controllability are appreciated. Today, it is widely used in trains, elevators and so on. However, in the motor driving system (3), a three-phase power supplied to the three-phase induction motor is required to be a complete sine wave. On the other hand, the pseudo sine wave output from a PWM inverter has many harmonic components, which is a cause of resisting torque. This significantly reduces the efficiency of the three-phase induction motor. Furthermore, although regenerative braking is theoretically possible, it is necessary to separately provide an inverter for regeneration, resulting in a complex structure.

The motor driving system (4) has been proposed for many years, and has been studied by many researchers. However, it lacks practical use at present because there is no basis for its superiority to the motor driving system (3) described above, and particularly because there is no specific method of electric braking.

[Patent Document 1: Japanese Laid-open Patent Publication 2008-125195]

DISCLOSURE OF THE INVENTION

Problem to be Solved by the Invention

In the motor driving systems (1) and (2) described above, it is suitable to use a neodymium magnet in the motor. However, there are concerns of supply in the use of a large amount of neodymium magnets. Thus, the inventor of the present invention has considered it necessary to develop a motor driving system which assumes the use of a switched reluctance motor and which, without using a neodymium magnet, achieves a reduction in the size and weight and an increase in the efficiency of the switched reluctance motor and an improvement in the energy recovery efficiency at the time of regenerative braking. In particular, the increase in the efficiency of the switched reluctance motor and the improvement in the energy recovery efficiency at the time of regenerative braking are important to reduce emission of carbon dioxide.

Thus, it is an object of the present invention to provide a regenerative switched reluctance motor driving system which, without using a neodymium magnet, achieves a reduction in the size and weight and an increase in the efficiency of the switched reluctance motor and an improvement in the energy recovery efficiency at the time of regenerative braking.

Means for Solving the Problem

The regenerative switched reluctance motor driving system according to the present invention comprises: a power supply unit comprising a DC power supply and voltage control means connected to the DC power supply; a flip-flop circuit having an input terminal and an output terminal connected to the power supply unit and rendering first and second current paths alternately conductive; and a motor having a two-phase structure comprising a rotor made of iron with 2n (n: integer) salient portions provided at equal intervals on an outer periphery of a cylindrical structural body with a rotary shaft, and further comprising a stator made of iron with 4n magnetic poles annularly arranged at equal intervals around an outer periphery of the rotor via a gap from the salient portions, and still further comprising a first coil wound on every other one of the magnetic poles and a second coil wound on the magnetic poles without the first coil wound thereon, in which the first coil is connected to the first current path, and the second coil is connected to the second current path, wherein the voltage control means receives an input current from the DC power supply, and controls an output voltage to allow an output current to the flip-flop circuit to be a DC current with a magnitude of a commanded value regardless of the polarity and magnitude of load electromotive force, wherein the flip-flop circuit, while allowing the DC current to flow from the input terminal to the output terminal, renders the first and second current paths alternately conductive based on an angular position of the rotor so as to allow a rectangular-wave current having a width of an electrical angle of 180° to alternately flow in the first and second coils, and shifts the timing of rendering the first and second current paths alternately conductive, between when driving and when braking the motor, by a time during which the rotor is rotated by an angle corresponding to an electrical angle of 180°, and wherein when driving the motor, the voltage control means receives an input current through a positive terminal of the DC power supply, and outputs the DC current to the flip-flop circuit, and further receives and outputs the DC current input thereto from the flip-flop circuit to a negative terminal of the DC power supply so as to discharge the DC power supply, while when braking the motor, the voltage control means receives an input current through the negative terminal of the DC power supply, and outputs the DC current to the flip-flop circuit, and further receives and outputs the DC current regenerated from the motor through the flip-flop circuit and input thereto to the positive terminal of the DC power supply so as to charge the DC power supply.

According to this structure, a motor which does not require a neodymium magnet can be achieved by using an electromagnet. Further, it is possible to make the structure of the motor simpler than the conventional reluctance motor, achieving reduction in size and weight. Furthermore, by using the simple control to render the first and second current paths alternately conductive based on the angular position of the rotor so as to allow a rectangular-wave current having a width of an electrical angle of 180° to alternately flow in the first and second coils, it is possible to generate an effective rotational force in the rotor, achieving a high torque efficiency, as compared with the case of supplying e.g. a sine wave current. In addition, the timing of rendering the first and second current paths alternately conductive is shifted, between when driving and when braking the motor, by a time during which the rotor is rotated by an angle corresponding to an electrical angle of 180°, whereby the power supply unit, while supplying a DC current to a flip-flop circuit, can be discharged when driving the motor, and can be charged by regenerative power when braking the motor until the motor stops, i.e. until the electromotive force of the motor becomes zero, making it possible to improve energy recovery efficiency.

Also, the regenerative switched reluctance motor driving system according to the present invention comprises: a power supply unit comprising a DC power supply and voltage control means connected to the DC power supply; m (m: integer) flip-flop circuits having an input terminal and an output terminal connected to the power supply unit and rendering first and second current paths alternately conductive; and m motors having a two-phase structure comprising a rotor made of iron with 2n (n: integer) salient portions provided at equal intervals on an outer periphery of a cylindrical structural body with a rotary shaft, and further comprising a stator made of iron with 4n magnetic poles annularly arranged at equal intervals around an outer periphery of the rotor via a gap from the salient portions, and still further comprising a first coil wound on every other one of the magnetic poles and a second coil wound on the magnetic poles without the first coil wound thereon, in which the first coil is connected to the first current path of a corresponding flip-flop circuit of the m flip-flop circuits, and the second coil is connected to the second current path of the corresponding flip-flop circuit of the m flip-flop circuits, wherein the m motors have the rotary shaft in common, in which positions of the salient portions on the respective rotors in a rotational direction of the rotary shaft are the same, while reference positions in the respective stators are at intervals of 90°/m in the rotational direction of the rotary shaft, wherein the voltage control means receives an input current from the DC power supply, and controls an output voltage to allow an output current to the flip-flop circuit to be a DC current with a magnitude of a commanded value regardless of the polarity and magnitude of load electromotive force, wherein the m flip-flop circuits, while allowing the DC current to flow from the input terminal to the output terminal, render the first and second current paths alternately conductive based on an angular position of the corresponding rotor so as to allow a rectangular-wave current having a width of an electrical angle of 180° to alternately flow in the first and second coils, and shift the timing of rendering the first and second current paths alternately conductive, between when driving and when braking the motor, by a time during which the rotor is rotated by an angle corresponding to an electrical angle of 180°, and wherein when driving the motor, the voltage control means receives an input current through a positive terminal of the DC power supply, and outputs the DC current to the flip-flop circuit, and further receives and outputs the DC current input thereto from the flip-flop circuit to a negative terminal of the DC power supply so as to discharge the DC power supply, while when braking the motor, the voltage control means receives an input current through the negative terminal of the DC power supply, and outputs the DC current to the flip-flop circuit, and further receives and outputs the DC current regenerated from the motor through the flip-flop circuit and input thereto to the positive terminal of the DC power supply so as to charge the DC power supply.

According to this structure, a motor which does not require a neodymium magnet can be achieved by using an electromagnet. Further, it is possible to make the structure of the motor simpler than the conventional reluctance motor, achieving reduction in size and weight. Furthermore, by using the simple control to render the first and second current paths alternately conductive based on the angular position of the rotor so as to allow a rectangular-wave current having a width of an electrical angle of 180° to alternately flow in the first and second coils, it is possible to generate an effective rotational force in the rotor, achieving a high torque efficiency, as compared with the case of supplying e.g. a sine wave current. In addition, the timing of rendering the first and second current paths alternately conductive is shifted, between when driving and when braking the motor, by a time during which the rotor is rotated by an angle corresponding to an electrical angle of 180°, whereby the power supply unit, while supplying a DC current to a flip-flop circuit, can be discharged when driving the motor, and can be charged by regenerative power when braking the motor until the motor stops, i.e. until the electromotive force of the motor becomes zero, making it possible to improve energy recovery efficiency.

In addition, the m flip-flop circuits allow the first coil of a corresponding motor and the second coil of the corresponding motor to be connected to the first current path and the second current path, respectively, and renders the first and second current paths alternately conductive, in which further the m motors have the rotary shaft in common, and the positions of the salient portions on the respective rotors in the rotational direction of the rotary shaft are the same, while the reference positions in the respective stators are at intervals of 90°/m in the rotational direction of the rotary shaft, whereby IL is possible to eliminate torque zero points, reducing torque ripple, and to reduce the relative reactance of the first and second coils, reducing overvoltage when switching the current paths to be rendered conductive.

Effects of the Invention

The regenerative switched reluctance motor driving system of the present invention can achieve a reduction in the size and weight and an increase in the efficiency of the switched reluctance motor and an improvement in the energy recovery efficiency at the time of regenerative braking without using a neodymium magnet.

DESCRIPTION OF REFERENCE NUMERALS

Figure 1:
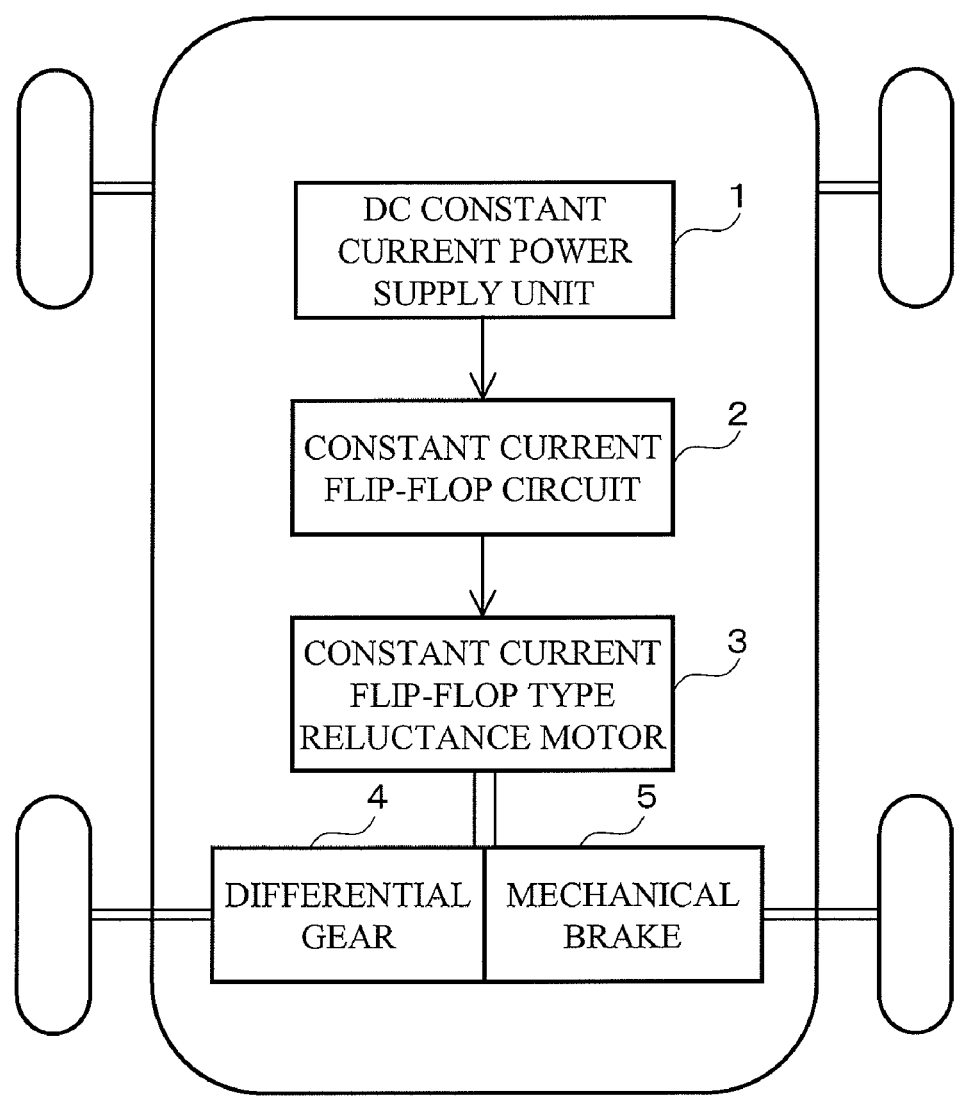
FIG. 1 is a view showing a structure of an electric car.

1 DC constant current power supply unit
2, 2-1, 2-2, 2-3, 2-4 Constant current flip-flop circuit
3, 3-1, 3-11, 3-12, 3-13, 3-14 Constant current flip-flop type reluctance motor
4 Differential gear
5 Mechanical brake
10 Rotor
11 Rotor iron core
12-1, 12-2, 12-3, 12-4 Rotor salient pole
13 Rotary shaft
14 Stator
15 Yoke
16-1, 16-2, 16-3, 16-4, 16-5, 16-6, 16-7, 16-8 Stator magnetic pole
17-1, 17-2, 17-3, 17-4, 17-5, 17-6, 17-7, 17-8 Excitation coil
17a A-phase coil
17b B-phase coil
20-1, 20-2, 20-3, 20-4, 131 Semiconductor switch
21 Commutation capacitor
22-1, 22-2, 22-3, 22-4 Diode
60 Flip-flop control circuit
129, 139 DC power supply
130, 140 Reactor
135, 145 Constant current power supply control unit
146 Charge/discharge switching device
147 Constant current chopper

BEST MODE FOR CARRYING OUT THE INVENTION

In the regenerative switched reluctance motor driving system, a power supply unit, while supplying a constant DC current to a flip-flop circuit, can be discharged when driving a motor, and can be charged by regenerative power when braking the motor until the motor stops, so as to improve energy efficiency.

EXAMPLE 1

FIG. 1 shows a structure of an electric car to which a regenerative switched reluctance motor driving system according to an embodiment of the present invention is applied. Referring to FIG. 1, the electric car has a DC constant current power supply unit 1, a constant current flip-flop circuit 2, a constant current flip-flop type reluctance motor 3 as a regenerative switched reluctance motor, a differential gear 4 and a mechanical brake 5. Among them, the regenerative switched reluctance motor driving system according to the embodiment of the present invention mainly comprises the DC constant current power supply unit 1, the constant current flip-flop circuit 2 and the constant current flip-flop type reluctance motor 3. Note that although only one multi-phase constant current motor 1 is provided in FIG. 1, it can also be structured to place one for each tire to omit the differential gear 4. In the regenerative switched reluctance motor driving system according to the embodiment of the present invention, the mechanical brake 5 is not necessary in normal driving as described later, but has a role as a lock for the tire after stop and as a brake in an emergency.

The DC constant current power supply unit 1 operates to output a constant DC current with a constant magnitude in a constant direction regardless of the polarity and magnitude of the electromotive force of the constant current flip-flop type reluctance motor 3 as a load. Note that while the magnitude of the constant DC current has a constant value, the constant value can be arbitrarily set. When the constant current flip-flop type reluctance motor 3 as a load is braked, i.e. when load electromotive force is negative, the DC constant current power supply unit 1 operates to recover regenerative power from the load.

The constant current flip-flop circuit 2 receives a constant DC current as input from the pre-stage DC constant current power supply unit 1, and has a function of allowing a rectangular-wave current to flow alternately in two coils of the constant current flip-flop type reluctance motor 3 as described later. In other words, the constant current flip-flop circuit 2 allows a two-phase rectangular current to flow.

When the constant current flip-flop type reluctance motor 3 receives a two-phase rectangular-wave current from the pre-stage constant current flip-flop circuit 2, two adjacent stator magnetic poles are alternately magnetized in synchronization with the rotation of the rotor. These two adjacent stator magnetic poles cause an attractive force to generate a rotational force in the rotor.

In a conventional motor driving system using a switched reluctance motor, a three-phase PWM inverter uses a DC constant voltage power supply as input, and generates and supplies a pseudo sine-wave current or a rectangular-wave current having a width of an electrical angle of 120° or the like to the switched reluctance motor. In such a conventional motor driving system using a switched reluctance motor, due to various relationships such as relationship between the DC constant voltage power supply, large reactance and number of excitation poles of an excitation coil, supplied power, and so on, it is not possible to supply a designed maximum current to the excitation coil at a timing at which a torque is required to be generated in the excitation poles. Furthermore, in the conventional motor driving system using a switched reluctance motor, it is not possible to make zero the current flowing in the excitation coil at a timing at which it should be made zero, thereby causing unnecessary resisting torque. In addition, no method has been found to extract regenerative power from the conventional motor driving system using a switched reluctance motor when regenerative electromotive force is generated therein, making regenerative braking impossible.

In contrast, in the regenerative switched reluctance motor driving system according to the embodiment of the present invention, the constant current flip-flop circuit 3 comprising semiconductor switches alternately supplies the output current of the DC constant current power supply unit 1 to excitation coils having a two-phase structure in synchronization with the rotation of the rotor in the constant current flip-flop type reluctance motor 3 so as to generate torque in the rotor. This structure allows a current with a designed maximum value to be virtually instantaneously supplied to the excitation coils at a timing at which torque is generated, while allowing the current flowing in the excitation coils to be instantaneously made zero at a timing at which the function of torque generation is completed, preventing unnecessary resisting torque from being generated. Furthermore, since the direction of the output current of the DC constant current power supply unit 1 is not changed while the timing of its supply to the excitation coils is shifted by a phase difference of 180° to make the load electromotive force negative, the power regeneration is performed in a natural way. As a result, regenerative braking is possible until stop, allowing high energy recovery efficiency, and the operation of the mechanical brake 5 is not necessary in normal driving.

Figure 2:
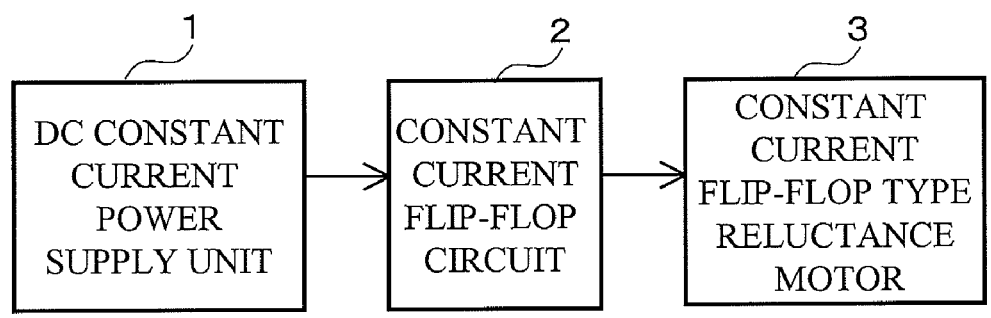
FIG. 2 is a diagram showing a structure of a regenerative switched reluctance motor driving system.

FIG. 2 is a block diagram of a basic structure of the regenerative switched reluctance motor driving system according to the embodiment of the present invention. The regenerative switched reluctance motor driving system shown in FIG. 2 has a DC constant current power supply unit 1, a constant current flip-flop circuit 2 and a constant current flip-flop type reluctance motor 3. Hereinafter, the structure of the regenerative switched reluctance motor driving system according to the embodiment of the present invention will be described in detail.

Figure 3:
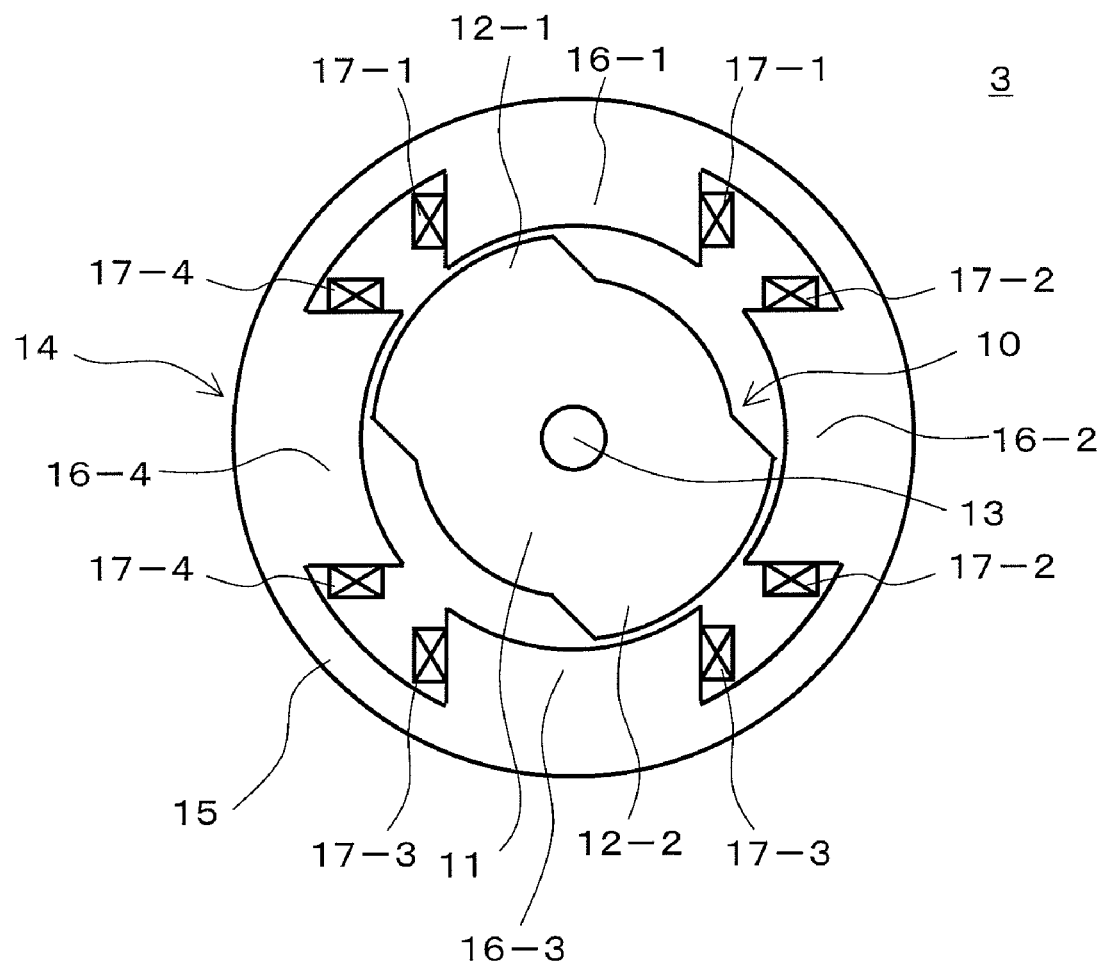
FIG. 3 is a cross-sectional view perpendicular to the axis of a constant current flip-flop type reluctance motor.

FIG. 3 is a cross-sectional view perpendicular to the axis of the constant current flip-flop type reluctance motor 3 in FIG. 2. The constant current flip-flop type reluctance motor 3 has a two-phase four-pole structure. A rotor 10 comprises a rotor iron core 11 and two salient poles (rotor salient poles) 12-1 and 12-2. The rotor iron core 11 is a cylindrical structural body made of iron, and is rotatably supported on a central rotary shaft 13 as an axis. The two rotor salient poles 12-1 and 12-2 are arranged on an outer periphery of the rotor iron core 11 at intervals of 180°.

An annular stator 14 is disposed around an outer periphery of the rotor 10 described above. The stator 14 comprises a yoke 15 and four stator magnetic poles 16-1, 16-2, 16-3 and 16-4. The yoke 15 is annular while the four stator magnetic poles 16-1, 16-2, 16-3 and 16-4 are arranged at equal intervals (here at intervals of 90°) on an inner periphery of the yoke 15 via a gap from the rotor salient poles 12-1 and 12-2.

An excitation coil 17-1 is wound on the stator magnetic pole 16-1. Similarly, an excitation coil 17-2, an excitation coil 17-3 and an excitation coil 17-4 are wound on the stator magnetic pole 16-2, stator magnetic pole 16-3 and stator magnetic pole 16-4, respectively. Among them, the excitation coil 17-1 and excitation coil 17-3 are wound and connected in series to cause magnetic flux to flow from the stator magnetic pole 16-1 toward the stator magnetic pole 16-3. The series-connected excitation coils 17-1 and 17-3 will be referred to as A-phase coil 17a below. Similarly, the excitation coil 17-2 and excitation coil 17-4 are wound and connected in series to cause magnetic flux to flow from the stator magnetic pole 16-2 toward the stator magnetic pole 16-4. The series-connected excitation coils 17-2 and 17-4 will be referred to as B-phase coil 17b below. Note that the constant current flip-flop type reluctance motor 3 is formed to have an appropriate thickness in the direction perpendicular to the paper surface of FIG. 3.

Figure 4:
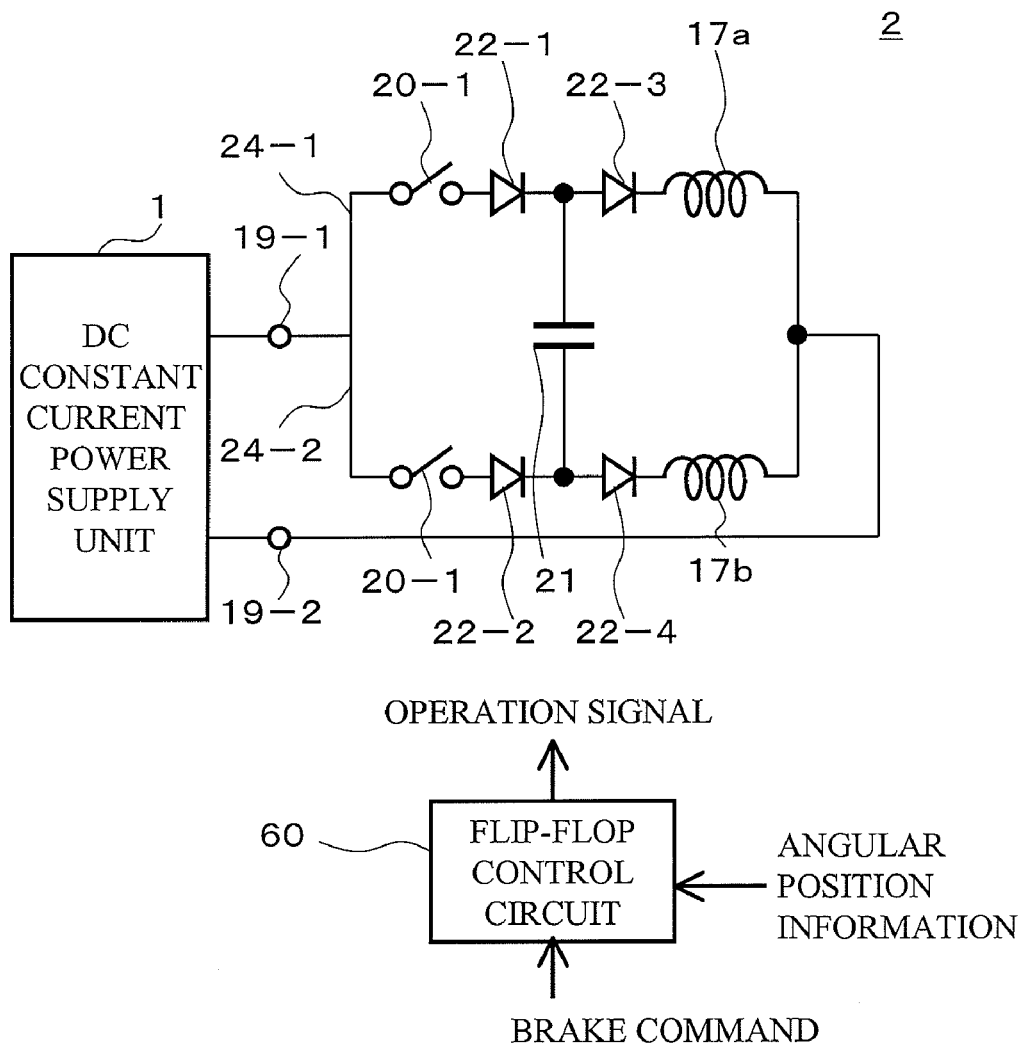
FIG. 4 is a view showing a structure of a constant current flip-flop circuit.

FIG. 4 is a view showing a structure of the constant current flip-flop circuit 2 in FIG. 2. The constant current flip-flop circuit 2 has an input terminal 19-1 and an output terminal 19-2 connected to the DC constant current power supply unit 1. Current paths 24-1 and 24-2 are formed between the input terminal 19-1 and the output terminal 19-2. Connected to the current path 24-1 in order from the input terminal 19-1 side are: a semiconductor switch 20-1 such as IGBT, thyristor and power transistor; a diode 22-1 having an anode on the input terminal side and a cathode on the output terminal 19-2 side; a diode 22-3 having an anode on the input terminal side and a cathode on the output terminal 19-2 side; and the A-phase coil 17a in the constant current flip-flop type reluctance motor 3.

Also connected to the current path 24-2 in order from the input terminal 19-1 side are: a semiconductor switch 20-2 such as IGBT, thyristor and power transistor; a diode 22-2 having an anode on the input terminal 19-1 side and a cathode on the output terminal 19-2 side; a diode 22-4 having an anode on the input terminal 19-1 side and a cathode on the output terminal 19-2 side; and the B-phase coil 17b in the constant current flip-flop type reluctance motor 3. A point between the cathode of the diode 22-1 and the anode of the diode 22-3 and a point between the cathode of the diode 22-2 and the anode of the diode 22-4 are connected by a commutation capacitor 21.

The semiconductor switches 20-1 and 20-2 perform the so-called flip-flop operation such that when one of them is on, the other is off. When the semiconductor switch 20-1 is on and the semiconductor switch 20-2 is off, a constant DC current from the DC constant current power supply unit 1 flows through the current path 24-1 and is supplied to the A-phase coil 17a. On the other hand, when the semiconductor switch 20-2 is on and the semiconductor switch 20-1 is off, the output current from the DC constant current power supply unit 1 flows through the current path 24-2 and is supplied to the B-phase coil 17b. In other words, when the semiconductor switches 20-1 and 20-2 are alternately switched on and off, a rectangular-wave current with a peak value equal to a constant DC current value I from the DC constant current power supply unit 1 flows in the A-phase coil 17a and the B-phase coil 17b.

The commutation capacitor 21 serves to prevent the occurrence of an overvoltage when the semiconductor switches 20-1 and 20-2 are switched to change from a state where a current flows in the A-phase coil 17a to a state where a current flows in the B-phase coil 17b, or to change from a state where a current flows the in B-phase coil 17b to a state where a current flows in the A-phase coil 17a. The diodes 22-1, 22-2, 22-3 and 22-4 serve to assist the charging of the commutation capacitor 21.

A magnetic energy $\frac{1}{2} LI^2$ of e.g. the excitation coil 17-1 (L: reactance of e.g. the excitation coil 17-1, I: current of e.g. the excitation coil 17-1) is once stored as an electrostatic energy $\frac{1}{2} CV^2$ of the commutation capacitor 21 (C: electrostatic capacity of the commutation capacitor 21, V: charge voltage of the commutation capacitor 21). Here, when the electrostatic capacity of the commutation capacitor 21 is reduced, the commutation time decreases while the overvoltage increases. On the other hand, when the electrostatic capacity of the commutation capacitor 21 is increased, the commutation time increases while the overvoltage decreases. From these relationships, the electrostatic capacity of the commutation capacitor 21 is determined to have appropriate values of overcurrent and commutation time.

A flip-flop control circuit 60 serves to control the on/off switching of the semiconductor switches 20-1 and 20-2 described above. The flip-flop control circuit 60 receives input angular position information indicating an angular position of the rotor 11 in the constant current flip-flop type reluctance motor 3, and, based on the angular position, outputs an operation signal for switching the semiconductor switches 20-1 and 20-2 on and off to the semiconductor switches 20-1 and 20-2. Further, when receiving an input brake command, the flip-flop control circuit 60 shifts the output timing of the operation signal, from the output timing when driving, by a time during which the rotor 11 is rotated by an angle corresponding to an electrical angle of 180°.

Figure 5:
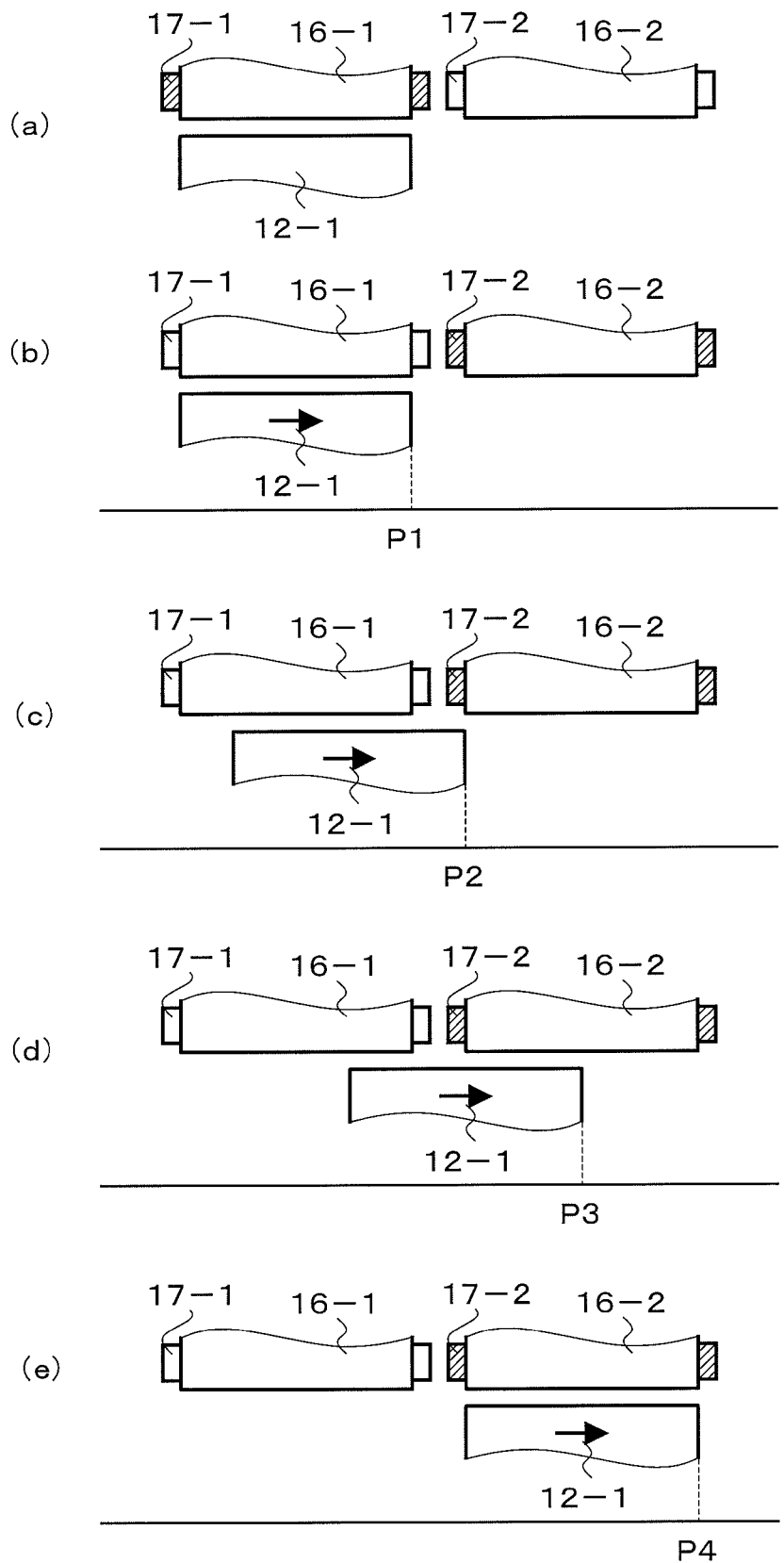
FIG. 5 are state transition diagrams for explaining the principle of torque generation when driving the constant current flip-flop type reluctance motor.

As described above, torque is generated in the constant current flip-flop type reluctance motor 3 when a rectangular-wave current alternately flows in the A-phase coil 17a and the B-phase coil 17b. FIG. 5 is a state transition diagram for explaining the principle of torque generation when driving the constant current flip-flop type reluctance motor 3. In FIG. 5, the rotor salient pole 12-1 in the rotor 11 as well as the stator magnetic poles 16-1 and 16-2, the excitation coil 17-1 forming the A-phase coil 17a and the excitation coil 17-2 forming the B-phase coil 17b in the stator 14, which are in the constant current flip-flop type reluctance motor 3 shown in FIG. 3, are replaced and represented by line shapes.

FIG. 5(a) shows a state where the semiconductor switch 20-1 is on, and the semiconductor 20-2 is off, and a rectangular-wave current flows in the excitation coil 17-1 (hatched portion) forming the A-phase coil 17a to excite the excitation coil 17-1 so as to magnetize the stator magnetic pole 16-1, so that the rotor salient pole 12-1 is attracted to the stator magnetic pole 16-1 to move toward the stator magnetic pole 16-1, whereby the rotor salient pole 12-1 and the stator magnetic pole 16-1 completely face each other.

At the timing when the state shown in FIG. 5(a) is reached, the flip-flop control circuit 60 switches the semiconductor switch 20-1 off and the semiconductor switch 20-2 on. This causes a transition from a state where the rectangular-wave current flows in the excitation coil 17-1 forming the A-phase coil 17a to a state where, as shown in FIG. 5(b), a rectangular-wave current flows in the excitation coil 17-2 (hatched portion) forming the B-phase coil 17b (right end of the rotor salient pole 12-1 is at position P1).

Thus, the excitation coil 17-2 is excited to magnetize the stator magnetic pole 16-2, so that the rotor salient pole 12-1 is attracted to the stator magnetic pole 16-2, generating a rotational force in the rotor salient pole 12-1, so as to move toward the stator magnetic pole 16-2. In the state shown in FIG. 5(c) (right end of the rotor salient pole 12-1 is at position P2) and in the state shown in FIG. 5(d) (right end of the rotor salient pole 12-1 is at position P3), a rotational force is being generated in the rotor salient pole 12-1.

As shown in FIG. 5(e), when the rotor salient pole 12-1 and the stator magnetic pole 16-2 are in a state where they completely face each other, i.e. when the rotor salient pole 12-1 is rotated from the state shown in FIG. 5(b) by an angle corresponding to an electrical angle of 180° (mechanical angle of 90°) (right end of the rotor salient pole 12-1 is at position P4), the flip-flop control circuit 60 switches the semiconductor switch 20-1 on and the semiconductor switch 20-2 off. Thereafter, state transitions shown in FIG. 5(b) to FIG. 5(e) are made, assuming that in FIG. 5(b) to FIG. 5(e) the stator magnetic pole 16-1 is replaced by the stator magnetic pole 16-2, and the excitation coil 17-1 is replaced by the excitation coil 17-2, generating a continuous rotational force in the rotor salient pole 16-1.

Figure 6:
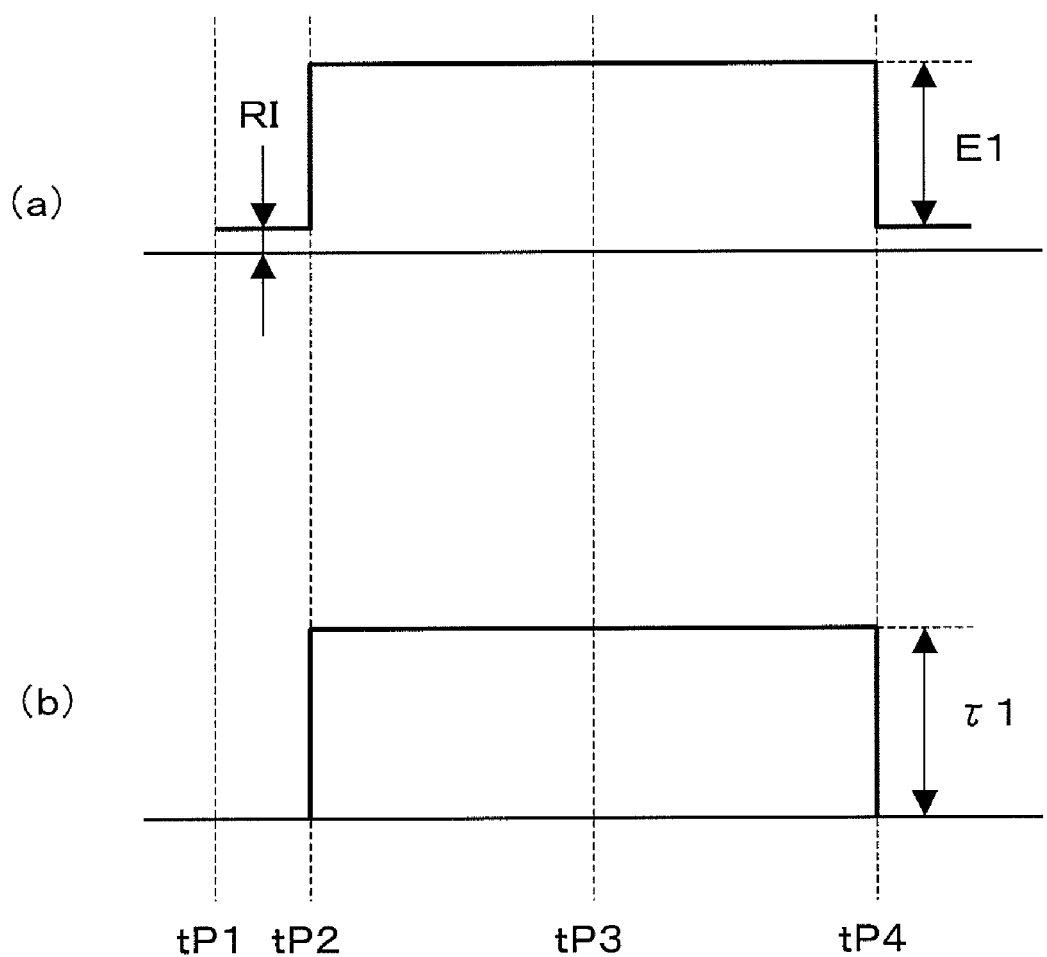
FIG. 6 are diagrams showing time transition of the electromotive force of an excitation coil in the case of FIG. 5 as well as time transition of the torque of the constant current flip-flop type reluctance motor.

FIG. 6 is a diagram showing time transition (FIG. 6(a)) of the electromotive force of the excitation coil 17-2 forming the B-phase coil 17b excited in the period from the state of FIG. 5(b) to the state of FIG. 5(e) as well as time transition (FIG. 6(b)) of the torque of the constant current flip-flop type reluctance motor 3. In FIG. 6, tP1, tP2, tP3 and tP4 on the horizontal axis represent time when the right end of the rotor salient pole 12-1 in FIG. 5(b) to FIG. 5(e) reaches the positions P1, P2, P3 and P4.

In the period from the state of FIG. 5(b) to the state of FIG. 5(c) (period from time tP1 to time tP2), a constant DC current I flows in the excitation coil 17-2. However, the rotor salient pole 12-1 does not face the stator magnetic pole 16-2 with the excitation coil 17-2 wound thereon, so that the excitation coil 17-2 is in the same state as an air-core coil, and virtually no magnetic flux is generated in the stator magnetic pole 16-2. Besides, a voltage drop (resistance drop) equal to the product RI of DC resistance R and constant DC current I occurs in the excitation coil 17-2.

On the other hand, in the period from the state of FIG. 5(c) to the state of FIG. 5(e) (period from time tP2 to time tP4), the rotor salient pole 12-1 overlaps the stator magnetic pole 16-2 with the excitation coil 17-2 wound thereon to generate, in the stator magnetic pole 16-2, magnetic flux substantially proportional to an area of overlap. The magnetic flux generated in the stator magnetic pole 16-2 is minimum at time tP1 when the right end of the rotor salient pole 12-1 is at position P1, and gradually increases during the transition to positions P2, P3 and P4. In the B-phase coil 17b having the excitation coil 17-2 wound on the stator magnetic pole 16-2, an electromotive force $E1=N \cdot d\Phi/dt$ is generated according to Faraday's law. Here, N is number of turns of the excitation coil 17-2, $\Phi$ is number of magnetic flux lines, and t is time.

Assuming that the speed of the rotor salient pole 12-1 in the horizontal direction in FIG. 5 is constant, the area of overlap between the rotor salient pole 12-1 and the stator magnetic pole 16-2 increases in proportion to time, so that the electromotive force E1 generated in the B-phase coil 17b is constant. Further, the polarity of the electromotive force E1 is in the direction opposite to the direction of the constant DC current I.

When the semiconductor switch 20-2 is switched on, while the electromotive force E1 is generated in the excitation coil 17-2 forming the B-phase coil 17b, so as to allow a constant DC current I to flow in the excitation coil 17-2, the load electromotive force E1 shown in FIG. 6(a) is applied to the DC constant current power supply unit 1. The DC constant current power supply unit 1 supplies a power obtained by multiplying the load electromotive force E1 shown in FIG. 6(a) and the constant DC current I to the excitation coil 17-2 in the constant current flip-flop type reluctance motor 3 as a load, whereby electrical energy I×E1 minus the resistance drop RI is converted into rotational energy of the constant current flip-flop type reluctance motor 3.

In addition, as shown in FIG. 6(b), torque is generated in the constant current flip-flop type reluctance motor 3 in the period from the state of FIG. 5(c) to the state of FIG. 5(e). This torque $\tau 1$ is a constant value proportional to the load electromotive force E1.

On the other hand, the electromotive force waveform of the excitation coil 17-1 forming the A-phase coil 17a and the torque waveform generated by supplying power to the excitation coil 17-1 are shifted from the electromotive force waveform of FIG. 6(a) and the torque waveform of FIG. 6(b) by a time during which the rotor 11 is rotated by an angle corresponding to an electrical angle of 180° (mechanical angle of 90°).

Note that the above has described the rotor salient pole 12-1, the stator magnetic pole 16-1 with the excitation coil 17-1 wound thereon, and the stator magnetic pole 16-2 with the excitation coil 17-2 wound thereon. This also applies to the rotor salient pole 12-2, the stator magnetic pole 16-3 with the excitation coil 17-3 wound thereon, and the stator magnetic pole 16-4 with the excitation coil 17-4 wound thereon that are on the opposite side.

Figure 7:
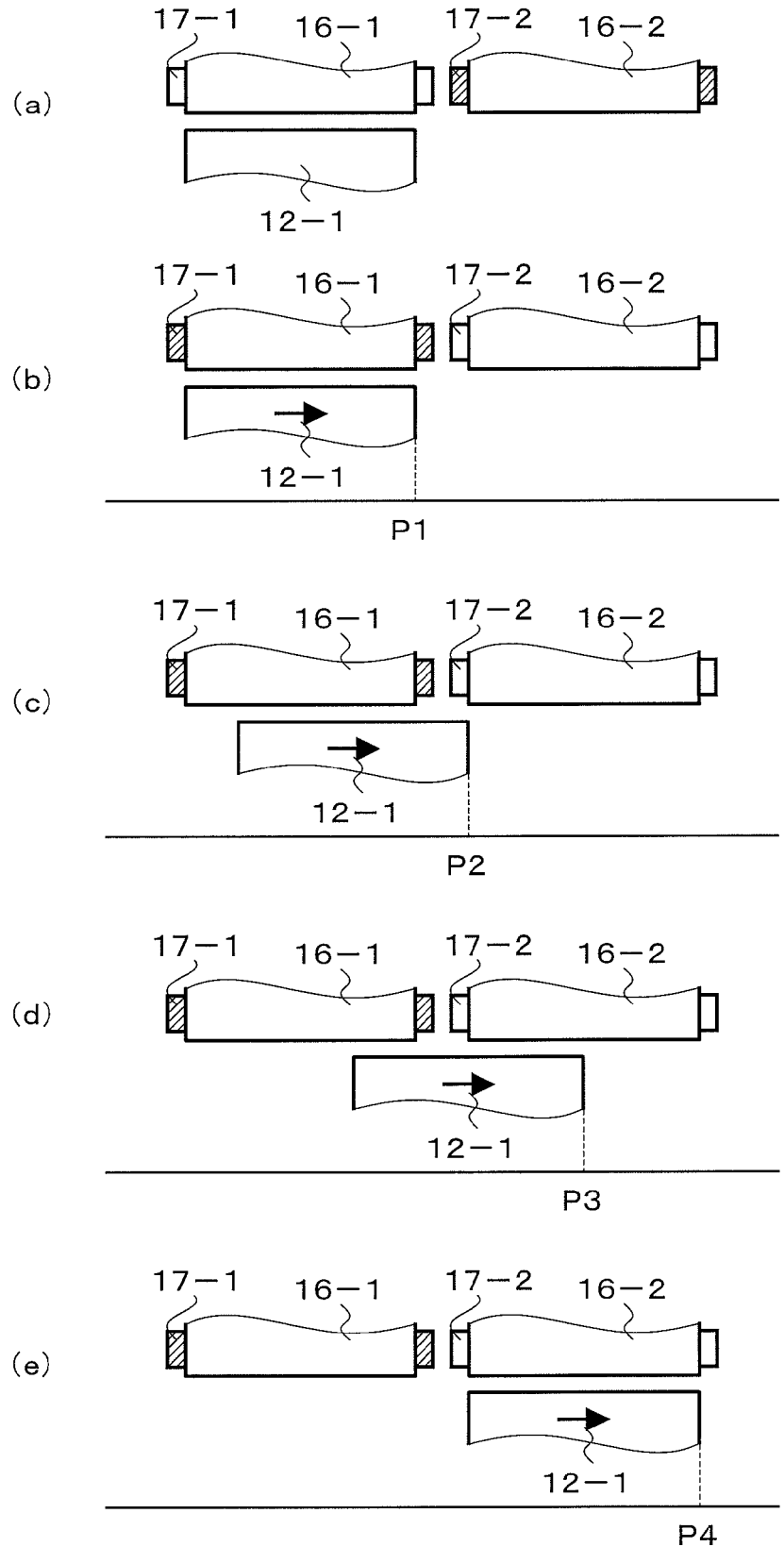
FIG. 7 are state transition diagrams for explaining the principle of torque generation at the time of regenerative braking of the constant current flip-flop type reluctance motor.

FIG. 7 is a state transition diagram for explaining the principle of torque generation at the time of regenerative braking of the constant current flip-flop type reluctance motor 3. As compared with the state transitions of FIG. 5, the state transitions of FIG. 7 are such that the timing to allow a constant DC current to flow in the excitation coils 17-1 and 17-2 is shifted by a time during which the rotor 11 is rotated by an angle corresponding to an electrical angle of 180° (mechanical angle of 90°).

FIG. 7(a) shows a state where the semiconductor switch 20-1 is off, and the semiconductor 20-2 is on, and a rectangular-wave current flows in the excitation coil 17-2 (hatched portion) forming the B-phase coil 17b to excite the excitation coil 17-2 so as to magnetize the stator magnetic pole 16-2, while the rotor salient pole 12-1 during rotation (moving rightward in FIG. 7) and the stator magnetic pole 16-1 completely face each other.

At the timing when the state shown in FIG. 7(a) is reached, the flip-flop control circuit 60 switches the semiconductor switch 20-1 on and the semiconductor switch 20-2 off. This causes a transition from a state where the rectangular-wave current flows in the excitation coil 17-2 forming the B-phase coil 17b to a state where, as shown in FIG. 7(b), a rectangular-wave current flows in the excitation coil 17-1 (hatched portion) forming the A-phase coil 17a (right end of the rotor salient pole 12-1 is at position P1).

Thus, the excitation coil 17-1 is excited to magnetize the stator magnetic pole 16-1, so that a force is applied to the rotor salient pole 12-1 to attract it to the stator magnetic pole 16-2. This force serves as a braking force which is a force opposite to the rotational direction. In the state shown in FIG. 7(c) (right end of the rotor salient pole 12-1 is at position P2) and in the state shown in FIG. 7(d) (right end of the rotor salient pole 12-1 is at position P3), a braking force is being generated in the rotor salient pole 12-1.

As shown in FIG. 7(e), when the rotor salient pole 12-1 and the stator magnetic pole 16-2 are in a state where they completely face each other, i.e. when the rotor salient pole 12-1 is rotated from the state shown in FIG. 7(b) by an angle corresponding to an electrical angle of 180° (mechanical angle of 90°) (right end of the rotor salient pole 12-1 is at position P4), the flip-flop control circuit 60 switches the semiconductor switch 20-1 off and the semiconductor switch 20-2 on. Thereafter, state transitions shown in FIG. 7(b) to FIG. 7(e) are made, assuming that in FIG. 7(b) to FIG. 7(e) the stator magnetic pole 16-1 is replaced by the stator magnetic pole 16-2, and the excitation coil 17-1 is replaced by the excitation coil 17-2, generating a continuous braking force in the rotor salient pole 16-1.

Figure 8:
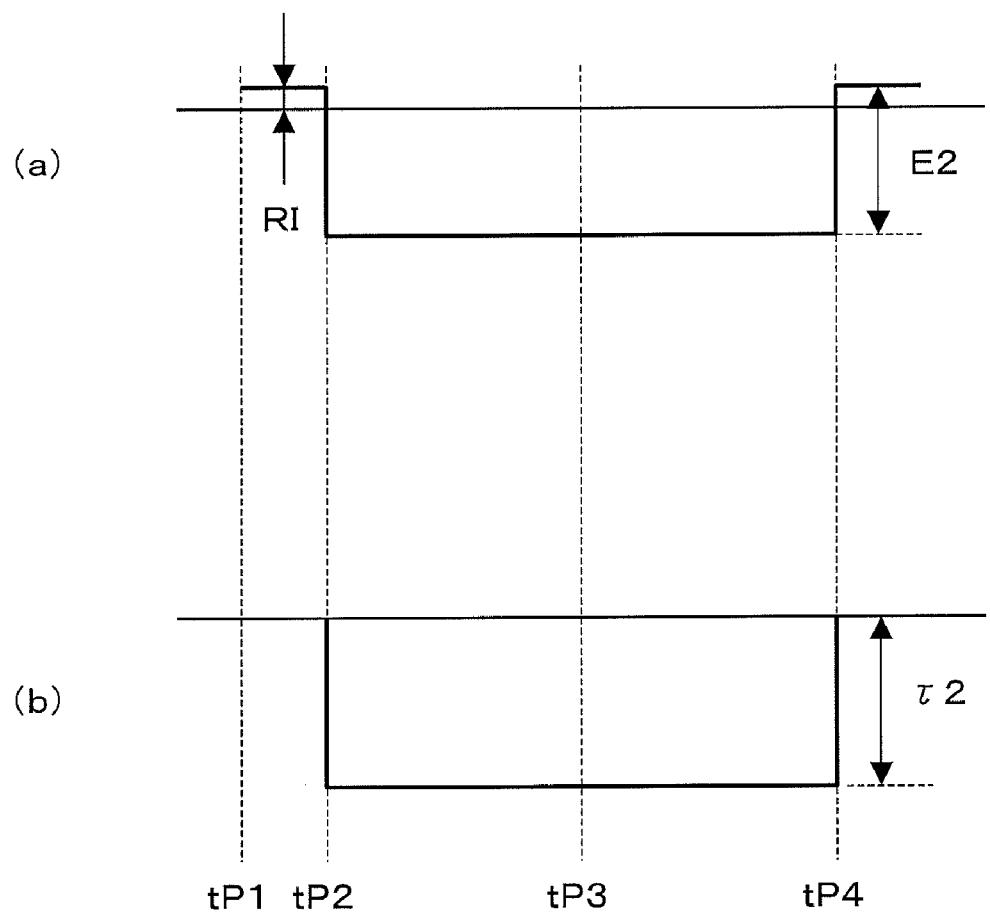
FIG. 8 are diagrams showing time transition of the electromotive force of an excitation coil in the case of FIG. 7 as well as time transition of the torque of the constant current flip-flop type reluctance motor.

FIG. 8 is a diagram showing time transition (FIG. 7(a)) of the electromotive force of the excitation coil 17-1 forming the A-phase coil 17a excited in the period from the state of FIG. 7(b) to the state of FIG. 7(e), and time transition (FIG. 7(b)) of the torque of the constant current flip-flop type reluctance motor 3. In FIG. 8, tP1, tP2, tP3 and tP4 on the horizontal axis represent time when the right end of the rotor salient pole 12-1 in FIG. 7(b) to FIG. 7(e) reaches the positions P1, P2, P3 and P4.

In the stator magnetic pole 16-1 with the excitation coil 17-1 forming the A-phase coil 17a wound thereon, magnetic flux substantially proportional to an area of overlap between the rotor salient pole 12-1 and the stator magnetic pole 16-1 is generated. Thus, the magnetic flux generated in the stator magnetic pole 16-1 is maximum at time tP1, when the right end of the rotor salient pole 12-1 is at position P1, and gradually decreases during the transition to positions P2, P3 and P4. In the A-phase coil 17a having the excitation coil 17-1 wound on the stator magnetic pole 16-1, an electromotive force $E2=N \cdot d\Phi/dt$ is generated according to Faraday's law.

Assuming that the speed of the rotor salient pole 12-1 in the horizontal direction is constant, the area of overlap between the rotor salient pole 12-1 and the stator magnetic pole 16-1 decreases in proportion to time, so that the electromotive force E2 generated in the A-phase coil 17a is constant. Further, the polarity of the electromotive force E2 is in the same direction as the direction of the constant DC current I.

When the semiconductor switch 20-1 is switched on, while the electromotive force E2 is generated in the excitation coil 17-1 forming the A-phase coil 17a, so as to allow a constant DC current I to flow in the excitation coil 17-1, an electrical energy obtained by multiplying the constant DC current I and the absolute value of the load electromotive force E2 minus the resistance drop RI is regenerated in the DC constant current power supply unit 1.

In addition, as shown in FIG. 8(b), braking torque is generated in the constant current flip-flop type reluctance motor 3 in the period from the state of FIG. 7(c) to the state of FIG. 7(e). This torque τ2 is a constant value proportional to the load electromotive force E2.

On the other hand, the electromotive force of the excitation coil 17-2 forming the B-phase coil 17b and the braking torque generated by supplying power to the excitation coil 17-2 are shifted from the electromotive force of FIG. 8(a) and the braking torque of FIG. 8(b) by a time during which the rotor 11 is rotated by an angle corresponding to an electrical angle of 180° (mechanical angle of 90°).

Note that the above has described the rotor salient pole 12-1, the stator magnetic pole 16-1 with the excitation coil 17-1 wound thereon, and the stator magnetic pole 16-2 with the excitation coil 17-2 wound thereon. This also applies to the rotor salient pole 12-2, the stator magnetic pole 16-3 with the excitation coil 17-3 wound thereon, and the stator magnetic pole 16-4 with the excitation coil 17-4 wound thereon that are on the opposite side.

Figure 9:
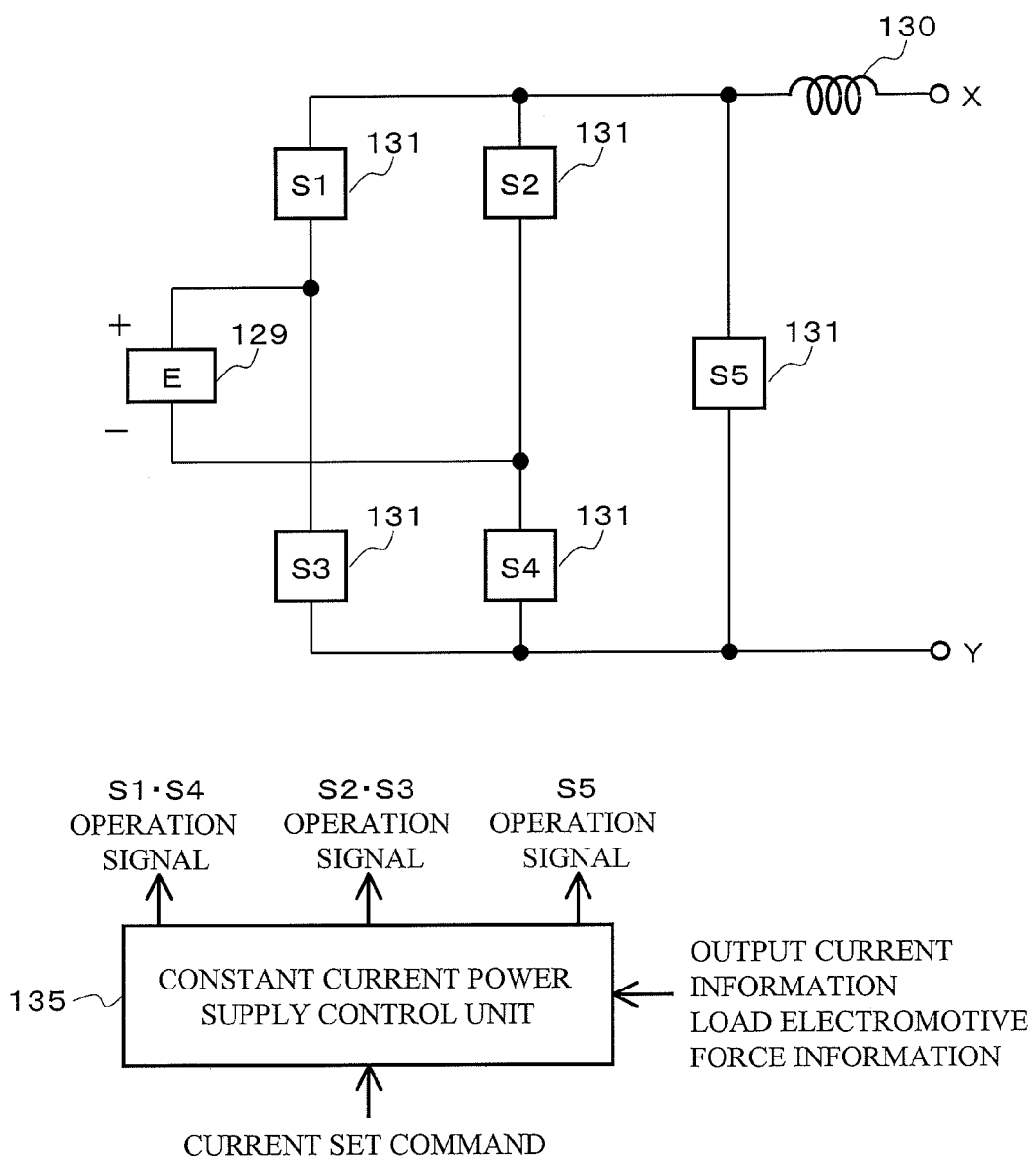
FIG. 9 is a view showing a structure of a DC constant current power supply unit.

FIG. 9 is a view showing a structure of the DC constant current power supply unit 1. In contrast to a power supply unit which is only controlled to output a constant output current, the DC constant current power supply unit 1 is characterized in that it is controlled to output a constant current (constant DC current) in a constant direction regardless of the polarity and magnitude of the electromotive force of the load, and has a function to receive power regenerated from the constant current flip-flop type reluctance motor 3 as a load.

The DC constant current power supply unit 1 mainly comprises an asymmetric PWM (Pulse Width Modulation) bridge (asymmetric PWM bridge). Semiconductor switches 131 in the asymmetric PWM bridge can be optionally selected from IGBTs, thyristors, power transistors and so on. The asymmetric PWM bridge has a part corresponding to a so-called AC terminal which is connected to a DC power supply 129, while the asymmetric PWM bridge also has a so-called DC terminal X connected to the input terminal 19-1 of the constant current flip-flop circuit 2, and a DC terminal Y connected to the output terminal 19-2 (refer to FIG. 4).

In the DC constant current power supply unit 1, semiconductor switches 131 (S1, S2, S3, S4) forming the asymmetric PWM bridge perform on/off operation in response to a predetermined carrier frequency signal, in which the on-time can be controlled. The pair of two semiconductor switches 131 (S1, S4) and the pair of two semiconductor switches 131 (S2, S3) do not operate symmetrically as in a common bridge, and are designed to operate each integrally and asymmetrically, corresponding to the positive or negative polarity of the load electromotive force. More specifically, when the pair of semiconductor switches 131 (S1, S4) operates, a voltage having a positive average value is output between both DC terminals X, Y, the value of which is controlled by the on-time length of the semiconductor switches 131 (S1, S4). Further, when the pair of semiconductor switches 131 (S2, S3) operates, a voltage having a negative average value is output between both DC terminals X, Y, the value of which is controlled by the on-time length of the semiconductor switches 131 (S2, S3).

A semiconductor switch 131 (S5) is connected in parallel to the output of the asymmetric PWM bridge, and forms a circulation circuit connecting a reactor 130 and the post-stage constant current flip-flop circuit 2. The semiconductor switch 131 (S5) operates to be turned on during the off-time of the pair of semiconductor switches 131 (S1, S4) and the off-time of the pair of semiconductor switches 131 (S2, S3). This allows supply of a constant DC current, without intermittence, to the constant current flip-flop circuit 2 even during the off-time of the pair of semiconductor switches 131 (S1, S4) and the off-time of the pair of semiconductor switches 131 (S2, S3).

A constant current power supply control unit 135 arranged in the DC constant current control unit 1 serves to control the semiconductor switches (S1, S2, S3, S4, S5) described above. The constant current power supply control unit 35 receives control information of output current, load electromotive force and so on, and outputs operation signals to drive the semiconductor switches 131 (S1 to S5) so that the output current of the DC constant current power supply unit 1, i.e. the output current to the constant current flip-flop circuit 2, is in a constant direction and is a constant current (constant DC current) with a magnitude commanded by a current set command, regardless of the polarity and magnitude of the load electromotive force.

Figure 10:
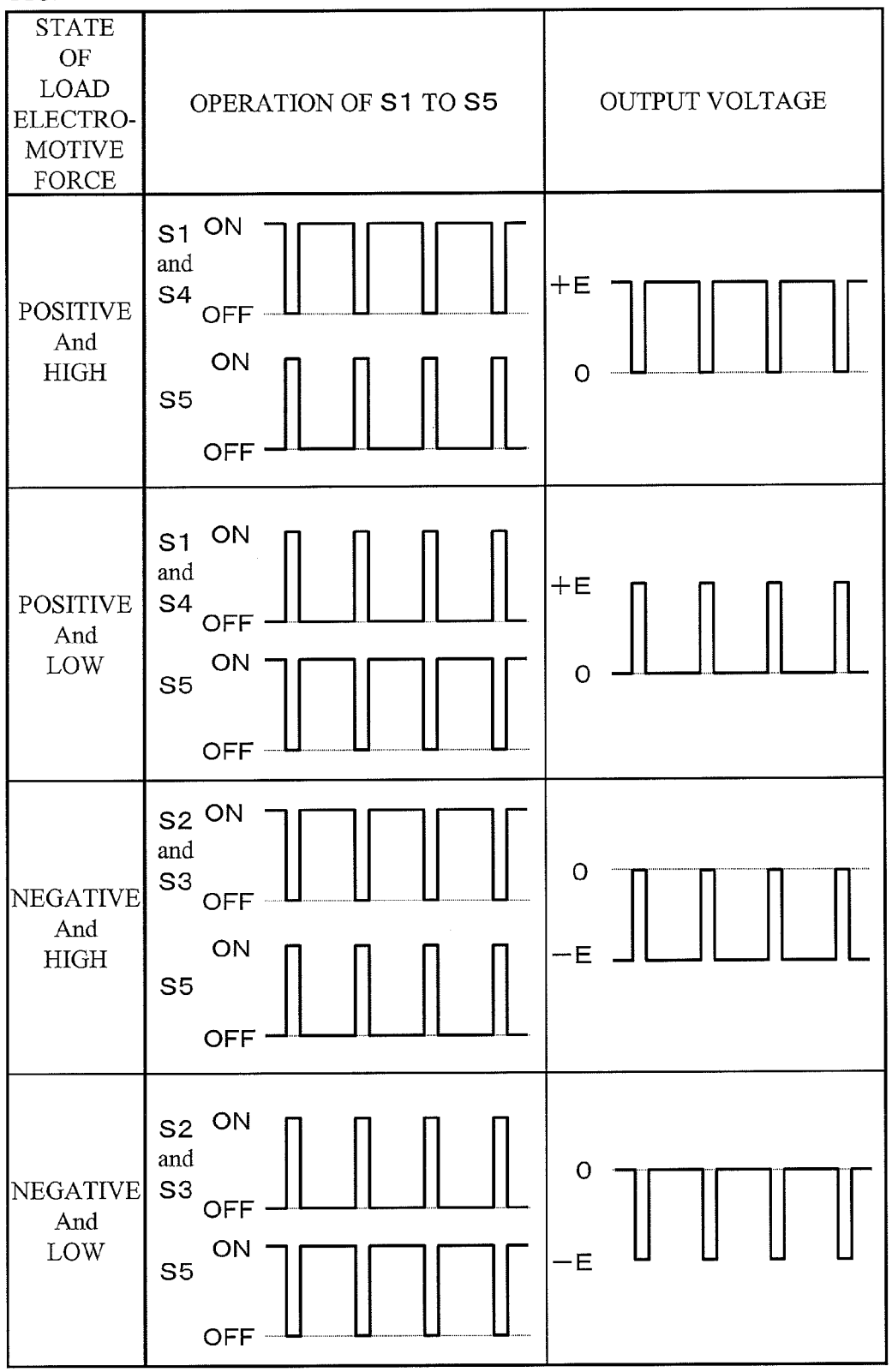
FIG. 10 is a chart showing the operations of semiconductor switches in the DC constant current power supply unit, and their output voltages at the time of the operations.

FIG. 10 is a chart showing the operations of the semiconductor switches 131 (S1 to S5) and their output voltages at the time of the operations under four conditions of high and low magnitudes in positive polarity and high and low magnitudes in negative polarity. When the load electromotive force is positive and high, the pair of semiconductor switches 131 (S1, S4) is selected, and the on time is increased. Thus, a voltage having a high positive average value is output between both DC terminals X, Y. When the load electromotive force is positive and low, the pair of semiconductor switches 131 (S1, S4) is selected, and the on-time is reduced. Thus, a voltage having a low positive average value is output between both DC terminals X, Y. On the other hand, when the load electromotive force is negative and high in absolute value, the pair of semiconductor switches 131 (S2, S3) is selected, and the on-time is increased. Thus, a voltage having a negative and high average value in absolute value is output between both DC terminals X, Y. When the load electromotive force is negative and low, the pair of semiconductor switches 131 (S1, S4) is selected, and the on-time is reduced. Thus, a voltage having a negative and low average value in absolute value is output between both DC terminals X, Y.

Figure 11:
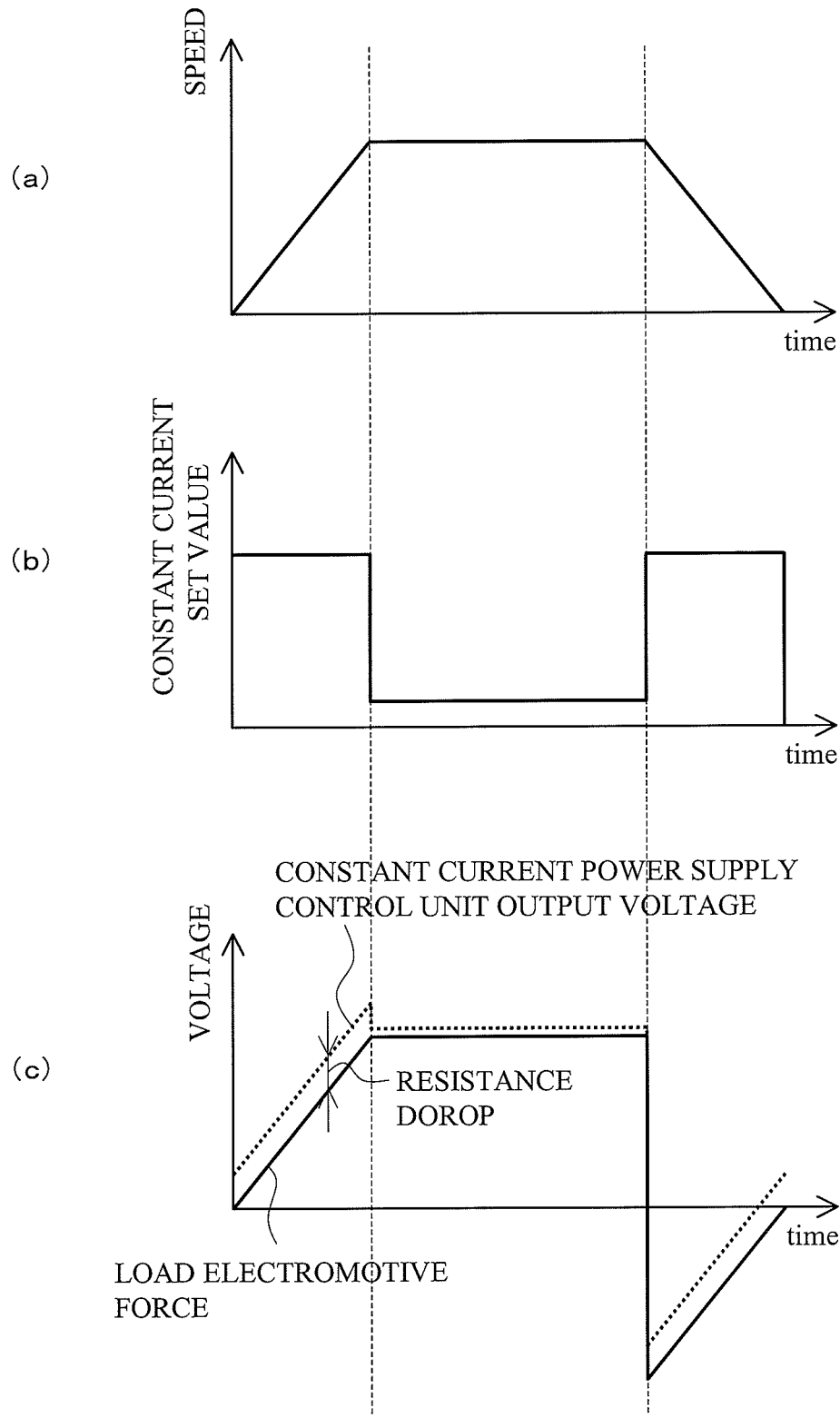
FIG. 11 are graphs showing driving states of a car, and operations of the DC constant current power supply unit.

FIG. 11 shows operations of the DC constant current power supply unit 1 corresponding to a series of operations of the constant current flip-flop type reluctance motor 3 that are start acceleration, constant-speed rotation, regenerative braking and stop. When operating the constant current flip-flop type reluctance motor 3 as shown in FIG. 11(a), the DC constant current power supply unit 1 is required to supply a higher current to the constant current flip-flop circuit 2 when driving and braking the constant current flip-flop type reluctance motor 3 than when rotating it at a constant speed, as shown in FIG. 11(b).

The load electromotive force of the DC constant current power supply unit 1 as seen from the DC terminal X is positive in the driving mode and negative in the braking mode, and has a magnitude substantially proportional to the rotational speed of the rotor of the constant current flip-flop type reluctance motor 3. As shown by the dotted line in FIG. 11(c), the DC constant current power supply unit 1 outputs a sum voltage of the positive or negative load electromotive force and a voltage drop (resistance drop) due to the resistance of the load circuit, making it possible to supply a constant DC current to the constant current flip-flop circuit 2. This enables regenerative braking until stop when braking the constant current flip-flop type reluctance motor 3, making it unnecessary to use a mechanical brake.

The load electromotive force of the constant current flip-flop type reluctance motor 3 on the load side is negative in the braking mode. In this case, the DC constant current power supply unit 1 allows the pair of semiconductor switches 131 (S2, S3) to operate, making the output voltage negative, and allowing a regenerative current to flow therein from the load side through a positive terminal of the DC power supply 129. The behavior of this phenomenon is like charging a battery. The DC power supply 129 has a charging function to charge regenerative power. On the other hand, if the DC power supply 129 is, for example, a fuel cell and has no charging function, it is necessary to connect an ultracapacitor in parallel to the DC power supply 129 to recover energy. Furthermore, even if the DC power supply 129 has a charging function like a lithium ion battery, it is desirable to connect an ultracapacitor in parallel to the DC power supply 129 for the case where suitable charging cannot be performed when the regenerative power varies abruptly in a few tens of seconds.

Thus, in the regenerative switched reluctance motor driving system of the constant current type, the constant current flip-flop circuit 2 performs the so-called flip-flop operation such that when one of the semiconductor switches 20-1 and 20-2 is on, the other is off, whereby a constant DC current from the DC constant current power supply unit 1 is alternately supplied to the A-phase coil 17a and the B-phase coil 17b in the constant current flip-flop type reluctance motor 3 so as to allow a rectangular-wave current to flow therein. Furthermore, the torque generated in the rotor 11 by the attractive force of the stator magnetic poles 16-1 to 16-4 is made theoretically maximum, and the timing to switch the semiconductor switches 20-1 and 20-2, when braking, is shifted from the output timing when driving by a time during which the rotor 11 is rotated by an angle corresponding to an electrical angle of 180°, enabling efficient power regeneration.

Note that in the embodiment described above, the constant current flip-flop type reluctance motor 3 has a two-phase four-pole structure in which the rotor 11 has two rotor salient poles 12-1 and 12-2 while the stator 41 has four stator magnetic poles 16-1, 16-2, 16-3 and 16-4. However, it can also have a two-phase n-pole structure in which the rotor has n rotor salient poles (n: an integer) while the stator has 2n stator magnetic poles.

Figure 12:
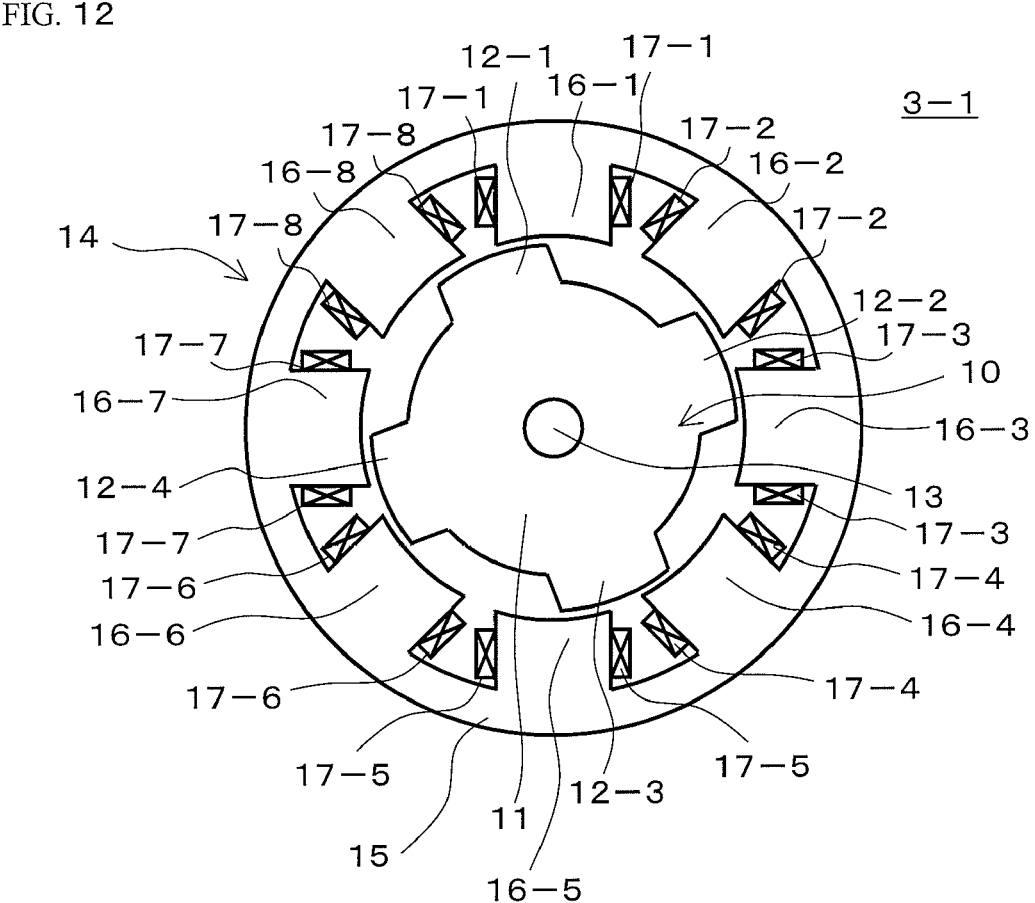
FIG. 12 is a cross-sectional view perpendicular to the axis of a constant current flip-flop type reluctance motor having another structure.

FIG. 12 is a cross-sectional view perpendicular to the axis of a two-phase eight-pole constant current flip-flop type reluctance motor. In the constant current flip-flop type reluctance motor 3-1 shown in FIG. 12, a rotor 10 comprises a rotor iron core 11 and four rotor salient poles 12-1, 12-2, 12-3 and 12-4. The four rotor salient poles 12-1 to 12-4 are arranged at equal intervals (here at intervals of 90°) on an outer periphery of the rotor iron core 11.

An annular stator 14 disposed around an outer periphery of the rotor 10 described above comprises a yoke 15 and eight stator magnetic poles 16-1, 16-2, 16-3, 16-4, 16-5, 16-6, 16-7 and 16-8. The eight stator magnetic poles 16-1 to 16-8 are arranged at equal intervals (here at intervals of) 45°) on an inner periphery of the yoke 15 via a gap from the rotor salient poles 12-1 to 12-4.

Excitation coils 17-1 to 17-8 are wound such that the excitation coil 17-1, excitation coil 17-2, excitation coil 17-3, excitation coil 17-4, excitation coil 17-5, excitation coil 17-5, excitation coil 17-6, excitation coil 17-7 and excitation coil 17-8 are wound on the stator magnetic pole 16-1, stator magnetic pole 16-2, stator magnetic pole 16-3, stator magnetic pole 16-4, stator magnetic pole 16-5, stator magnetic pole 16-5, stator magnetic pole 16-6, stator magnetic pole 16-7 and stator magnetic pole 16-8, respectively. Among them, the excitation coils 17-1, 17-3, 17-5 and 17-7 are wound and connected in series, forming an A-phase coil, to cause magnetic flux to flow from the stator magnetic pole 16-1 toward the stator magnetic pole 16-3 and magnetic flux to flow from the stator magnetic pole 16-5 toward the stator magnetic pole 16-7. Similarly, the excitation coils 17-2, 17-4, 17-6 and 17-8 are wound and connected in series, forming a B-phase coil, to cause magnetic flux to flow from the stator magnetic pole 16-2 toward the stator magnetic pole 16-4 and magnetic flux to flow from the stator magnetic pole 16-6 toward the stator magnetic pole 16-8.

When the two-phase eight-pole constant current flip-flop type reluctance motor 3-1 is used, it is possible to reduce the cross-sectional area of magnetic path in the yoke 15, achieving reduction in its size and weight, and to shift the torque ripple frequency to a higher range.

Figure 13:
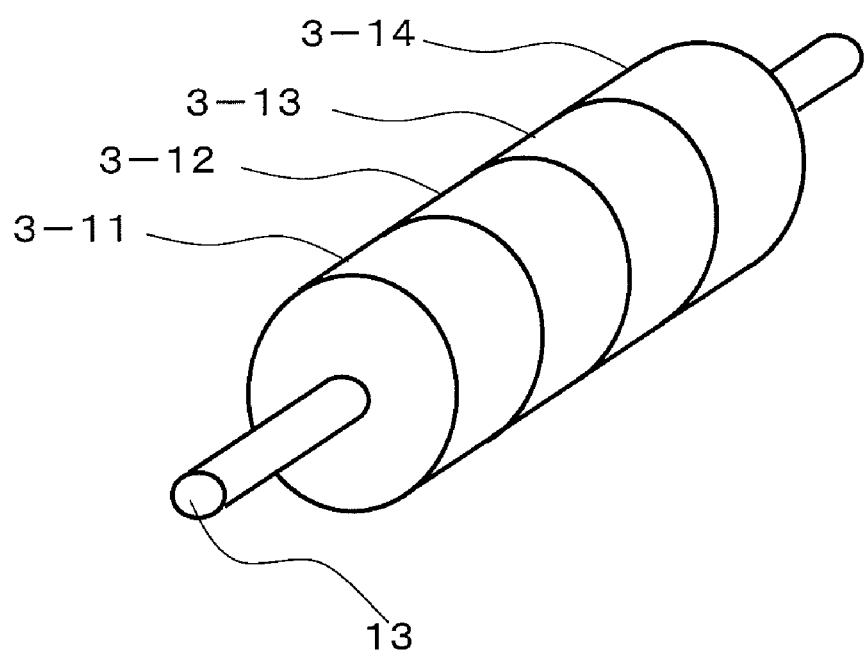
FIG. 13 is a view showing a structure of a motor unit.

It is also possible to use a motor unit of multiple connected constant current flip-flop type reluctance motors. FIG. 13 is an appearance perspective view of the motor unit, and FIG. 14 is views for explaining arrangement of the respective constant current flip-flop type reluctance motors forming the motor unit.

As shown in FIG. 13, the motor unit comprises constant current flip-flop type reluctance motors 3-11, 3-12, 3-13 and 3-14. These constant current flip-flop type reluctance motors 3-11, 3-12, 3-13 and 3-14 respectively have a structure the same as that of the constant current flip-flop type reluctance motor 3 shown in FIG. 3.

The constant current flip-flop type reluctance motors 3-11, 3-12, 3-13 and 3-14 have a rotary shaft 13 in common, in which the positions of the rotor salient poles 12-1 and 12-2 on respective rotors 11 in the rotational direction of the rotary shaft 13 are the same. Further, the constant current flip-flop type reluctance motors 3-11, 3-12, 3-13 and 3-14 are connected so that reference positions determined in the respective stators 14 are at intervals of 22.5° in the rotational direction of the rotary shaft 13. More specifically, the position of a reference position A of the stator 14 in the constant current flip-flop reluctance motor 3-12 shown in FIG. 14(b) is a position rotated by an angle of 22.5° in the rotational direction of the rotary shaft 13 (here rightward rotation) from the position of a reference position A of the stator 14 in the constant current flip-flop type reluctance motor 3-11 shown in FIG. 14(a). Further, the position of a reference position A of the stator 14 in the constant current flip-flop reluctance motor 3-13 shown in FIG. 14(c) is a position rotated by an angle of 22.5° in the rotational direction of the rotary shaft 13 from the position of the reference position A of the stator 14 in the constant current flip-flop type reluctance motor 3-12 shown in FIG. 14(b) (a position rotated by an angle of 45° in the rotational direction of the rotary shaft 13 from the position of the reference position A of the stator 14 in the constant current flip-flop type reluctance motor 3-11 shown in FIG. 14(a)). The position of a reference position A of the stator 14 in the constant current flip-flop reluctance motor 3-14 shown in FIG. 14(d) is a position rotated from the position of the reference position A of the stator 14 in the constant current flip-flop type reluctance motor 3-13 shown in FIG. 14(c) by an angle of 22.5° in the rotational direction of the rotary shaft 13 (a position rotated by an angle of 67.5° in the rotational direction of the rotary shaft 13 from the position of the reference position A of the stator 14 in the constant current flip-flop type reluctance motor 3-11 shown in FIG. 14(a)).

Figure 14:
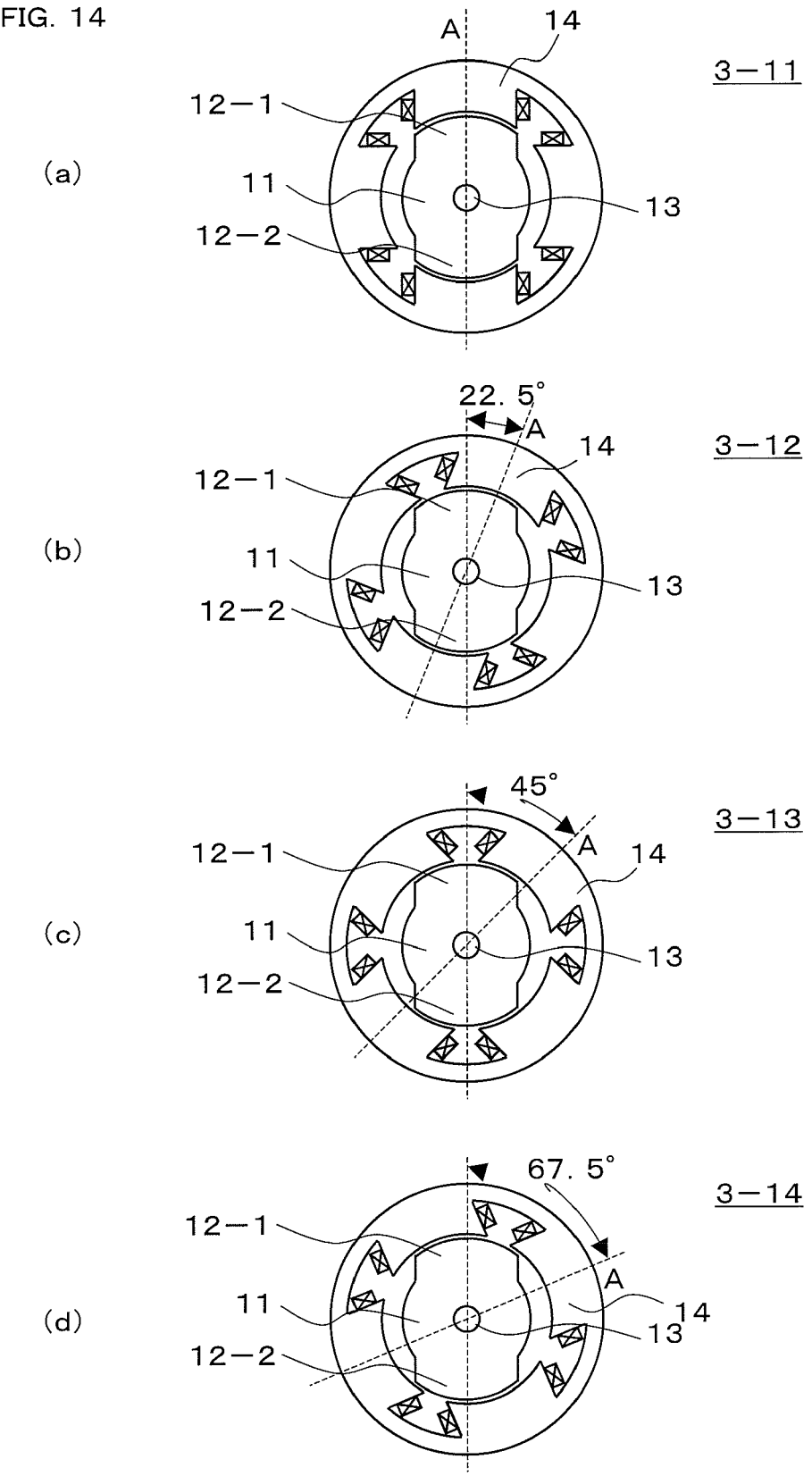
FIG. 14 are views showing arrangement of respective constant current flip-flop type reluctance motors forming the motor unit.
Figure 15:
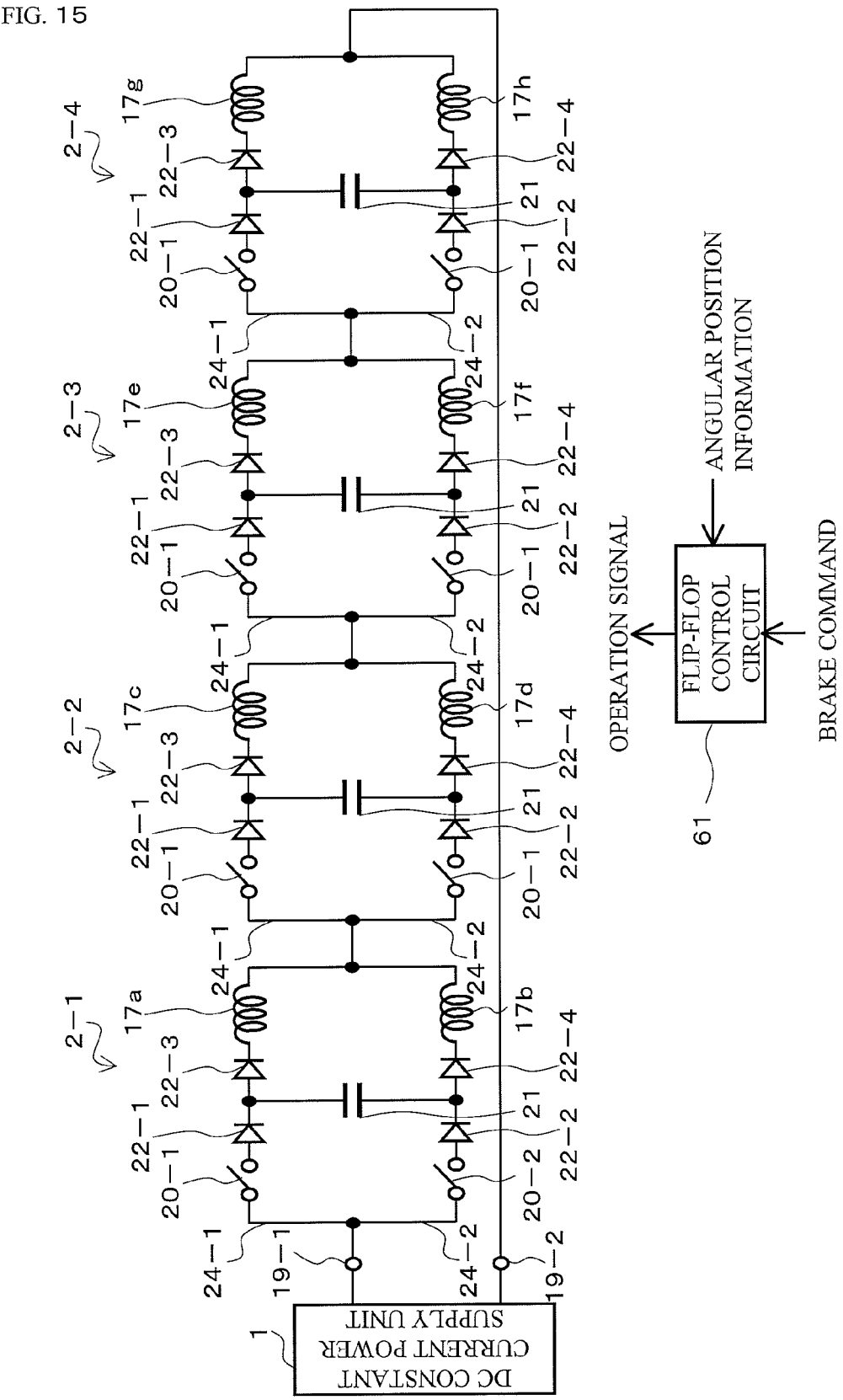
FIG. 15 is a view showing a structure of a constant current flip-flop circuit unit and a flip-flop control circuit in the case where the motor unit of FIG. 13 is used.

FIG. 15 is a view showing a structure of a constant current flip-flop circuit unit in the case where the motor unit shown in FIG. 13 and FIG. 14 is used. The constant current flip-flop circuit unit has an input terminal 19-1 and an output terminal 19-2 connected to the DC constant current power supply unit 1, while constant current flip-flop circuits 2-1, 2-2, 2-3 and 2-4 are connected in series between the input terminal 19-1 and the output terminal 19-2. The constant current flip-flop circuits 2-1, 2-2, 2-3 and 2-4 respectively have a structure the same as that of the constant current flip-flop circuit 2 shown in FIG. 4.

An A-phase coil 17a in the constant current flip-flop type reluctance motor 3-11 is connected to a current path 24-1, and a B-phase coil 17b in the constant current flip-flop type reluctance motor 3-11 is connected to a current path 24-2 of the constant current flip-flop circuit 2-1. An A-phase coil 17a in the constant current flip-flop type reluctance motor 3-12 is connected to a current path 24-1, and a B-phase coil 17b in the constant current flip-flop type reluctance motor 3-12 is connected to a current path 24-2 of the constant current flip-flop circuit 2-2. Similarly, an A-phase coil 17a in the constant current flip-flop type reluctance motor 3-13 is connected to a current path 24-1, and a B-phase coil 17b in the constant current flip-flop type reluctance motor 3-13 is connected to a current path 24-2 of the constant current flip-flop circuit 2-3. An A-phase coil 17a in the constant current flip-flop type reluctance motor 3-14 is connected to a current path 24-1, and a B-phase coil 17b in the constant current flip-flop type reluctance motor 3-14 is connected to a current path 24-2 of the constant current flip-flop circuit 2-4.

A constant current flip-flop control circuit 61 controls the respective constant current flip-flop circuits 2-1 to 2-4 similarly as the control of the constant current flip-flop circuit 60 shown in FIG. 4B. More specifically, the constant current flip-flop control circuit 61 receives input angular position information indicating an angular position of a rotor 11 in the constant current flip-flop type reluctance motor 3-11, and, based on the angular position, outputs an operation signal for switching the semiconductor switches 20-1 and 20-2 in the constant current flip-flop circuit 2-1 on and off to the semiconductor switches 20-1 and 20-2. Further, the constant current flip-flop control circuit 61 receives input angular position information indicating an angular position of the rotor 11 in the constant current flip-flop type reluctance motor 3-12, and, based on the angular position, outputs an operation signal for switching the semiconductor switches 20-1 and 20-2 in the constant current flip-flop circuit 2-2 on and off to the semiconductor switches 20-1 and 20-2. Similarly, the constant current flip-flop control circuit 61 receives input angular position information indicating an angular position of the rotor 11 in the constant current flip-flop type reluctance motor 3-13, and, based on the angular position, outputs an operation signal for switching the semiconductor switches 20-1 and 20-2 in the constant current flip-flop circuit 2-3 on and off to the semiconductor switches 20-1 and 20-2. Also similarly, the constant current flip-flop control circuit 61 receives input angular position information indicating an angular position of the rotor 11 in the constant current flip-flop type reluctance motor 3-14, and, based on the angular position, outputs an operation signal for switching the semiconductor switches 20-1 and 20-2 in the constant current flip-flop circuit 2-4 on and off to the semiconductor switches 20-1 and 20-2. Further, when receiving an input brake command, the flip-flop control circuit 61 shifts the output timing of the operation signal, from the output timing when driving, by a time during which the rotor 11 is rotated by an angle corresponding to an electrical angle of 180°.

Thus, torque is generated in the constant current flip-flop type reluctance motor 3 by allowing a rectangular-wave current to flow alternately in the A-phase coil 17a and the B-phase coil 17b of the constant current flip-flop type reluctance motors 3-11 to 3-14, respectively. The principle of torque generation is the same as the principle explained in FIG. 5 to FIG. 8.

By allowing the constant current flip-flop type reluctance motors 3-11, 3-12, 3-13 and 3-14 to have the rotary shaft 13 in common, in which the positions of the rotor salient poles 12-1 and 12-2 on the respective rotors 11 in the rotational direction of the rotary shaft 13 are the same, and by allowing the reference positions determined in the respective stators 14 to be at intervals of 22.5° in the rotational direction of the rotary shaft 13, and further by allowing the constant current flip-flop circuits 2-1, 2-2, 2-3 and 2-4 in the constant current flip-flop circuit unit to respectively perform switching of the semiconductor switches 20-1 and 20-2 described above, it is possible to eliminate torque zero points, reducing torque ripple, and to reduce the relative reactance of the excitation coils, reducing overvoltage when switching the current paths to be rendered conductive.

Figure 16:
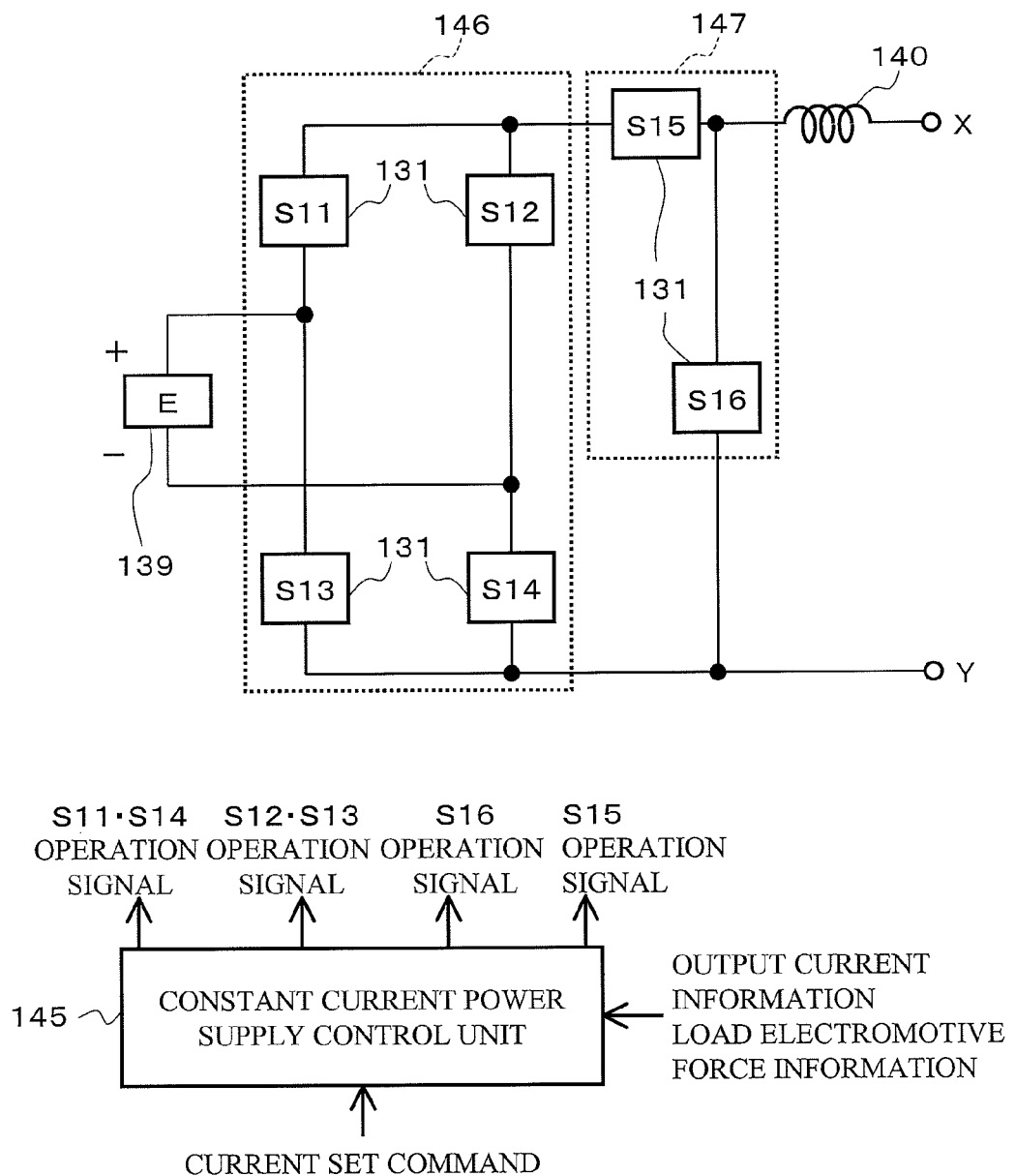
FIG. 16 is a view showing another structure of the DC constant current power supply unit.

Various other structures than FIG. 9 can be considered as a structure of the DC constant current power supply unit 1. FIG. 16 is a view showing another structure of the DC constant current power supply unit 1. The DC constant current power supply unit 1 shown in FIG. 16 has a DC power supply 139, a reactor 140, a charge/discharge switching device 146 and a constant current chopper 147. Among them, the charge/discharge switching device 146 comprises four semiconductor switches 41 (S11, S12, S13, S14). The constant current chopper 147 comprises two semiconductor switches 141 (S15 and S16). The semiconductor switches 141 (S11 to S14) operate in the same manner as the semiconductor switches 131 (S1 to S4) in FIG. 9, and the semiconductor switch 141 (S16) operates in the same manner as the semiconductor switch 131 (S5) in FIG. 9. On the other hand, a constant current power supply control unit 145 arranged in the DC constant current control unit 1 controls the semiconductor switches 131 (S1 to S6) described above by operation signals.

The charge/discharge switching device 146 receives operation signals from the constant current power supply control unit 145 to switch on either the pair of two semiconductor switches 141 (S1, S4) or the pair of two semiconductor switches 141 (S2, S3), thereby switching the polarity of the DC power supply 39.

The semiconductor switch 141 (S15) in the constant current chopper 147 receives an operation signal from the constant current power supply control unit 145 to perform high-speed on/off switching. The on-time length is controlled so as to output a predetermined constant DC current.

The semiconductor switch 141 (S16) in the constant current chopper 147 receives an operation signal from the constant current power supply control unit 145 to be turned on during the off-time of the semiconductor switch 141 (S15), and forms a circulation circuit connecting the reactor 140 and the post-stage constant current flip-flop circuit 2.

INDUSTRIAL APPLICABILITY

As described above, the regenerative switched reluctance motor driving system according to the present invention can improve energy recovery efficiency, and is useful as a regenerative switched reluctance motor driving system.

The invention claimed is:

1. A regenerative switched reluctance motor driving system comprising:
a power supply unit comprising a DC power supply and voltage control means connected to the DC power supply;
a flip-flop circuit having an input terminal and an output terminal connected to the power supply unit and rendering first and second current paths alternately conductive; and
a motor having a two-phase structure comprising a rotor made of iron with 2n (n: integer) salient portions provided at equal intervals on an outer periphery of a cylindrical structural body with a rotary shaft, and further comprising a stator made of iron with 4n magnetic poles annularly arranged at equal intervals around an outer periphery of the rotor via a gap from the salient portions, and still further comprising a first coil wound on every other one of the magnetic poles and a second coil wound on the magnetic poles without the first coil wound thereon, in which the first coil is connected to the first current path, and the second coil is connected to the second current path,
wherein the voltage control means receives an input current from the DC power supply, and controls an output voltage to allow an output current to the flip-flop circuit to be a DC current with a magnitude of a commanded value regardless of the polarity and magnitude of load electromotive force,
wherein the flip-flop circuit, while allowing the DC current to flow from the input terminal to the output terminal, renders the first and second current paths alternately conductive based on an angular position of the rotor so as to allow a rectangular-wave current having a width of an electrical angle of 180° to alternately flow in the first and second coils, and shifts the timing of rendering the first and second current paths alternately conductive, between when driving and when braking the motor, by a time during which the rotor is rotated by an angle corresponding to an electrical angle of 180°, and
wherein when driving the motor, the voltage control means receives an input current through a positive terminal of the DC power supply, and outputs the DC current to the flip-flop circuit, and further receives and outputs the DC current input thereto from the flip-flop circuit to a negative terminal of the DC power supply so as to discharge the DC power supply, while when braking the motor, the voltage control means receives an input current through the negative terminal of the DC power supply, and outputs the DC current to the flip-flop circuit, and further receives and outputs the DC current regenerated from the motor through the flip-flop circuit and input thereto to the positive terminal of the DC power supply so as to charge the DC power supply.

2. A regenerative switched reluctance motor driving system comprising:

a power supply unit comprising a DC power supply and voltage control means connected to the DC power supply;

m (m: integer) flip-flop circuits having an input terminal and an output terminal connected to the power supply unit and rendering first and second current paths alternately conductive; and m motors having a two-phase structure comprising a rotor made of iron with 2n (n: integer) salient portions provided at equal intervals on an outer periphery of a cylindrical structural body with a rotary shaft, and further comprising a stator made of iron with 4n magnetic poles annularly arranged at equal intervals around an outer periphery of the rotor via a gap from the salient portions, and still further comprising a first coil wound on every other one of the magnetic poles and a second coil wound on the magnetic poles without the first coil wound thereon, in which the first coil is connected to the first current path of a corresponding flip-flop circuit of the m flip-flop circuits, and the second coil is connected to the second current path of the corresponding flip-flop circuit of the m flip-flop circuits, wherein the m motors have the rotary shaft in common, in which positions of the salient portions on the respective rotors in a rotational direction of the rotary shaft are the same, while reference positions in the respective stators are at intervals of 90°/m in the rotational direction of the rotary shaft, wherein the voltage control means receives an input current from the DC power supply, and controls an output voltage to allow an output current to the flip-flop circuit to be a DC current with a magnitude of a commanded value regardless of the polarity and magnitude of load electromotive force, wherein the m flip-flop circuits, while allowing the DC current to flow from the input terminal to the output terminal, render the first and second current paths alternately conductive based on an angular position of the corresponding rotor so as to allow a rectangular-wave current having a width of an electrical angle of 180° to alternately flow in the first and second coils, and shift the timing of rendering the first and second current paths alternately conductive, between when driving and when braking the motor, by a time during which the rotor is rotated by an angle corresponding to an electrical angle of 180°, and wherein when driving the motor, the voltage control means receives an input current through a positive terminal of the DC power supply, and outputs the DC current to the flip-flop circuit, and further receives and outputs the DC current input thereto from the flip-flop circuit to a negative terminal of the DC power supply so as to discharge the DC power supply, while when braking the motor, the voltage control means receives an input current through the negative terminal of the DC power supply, and outputs the DC current to the flip-flop circuit, and further receives and outputs the DC current regenerated from the motor through the flip-flop circuit and input thereto to the positive terminal of the DC power supply so as to charge the DC power supply.

* * * * *